(12) United States Patent
Mazawa et al.

(10) Patent No.: US 7,039,425 B1
(45) Date of Patent: May 2, 2006

(54) TERMINAL USAGE LIMITING APPARATUS

(75) Inventors: Shiro Mazawa, Yokohama (JP);
Atsushi Teshima, Yokohama (JP);
Kazuhiro Sasame, Yokohama (JP);
Yoshitaka Iida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 958 days.

(21) Appl. No.: 09/602,964

(22) Filed: Jun. 23, 2000

(30) Foreign Application Priority Data

Jun. 25, 1999 (JP) .......................................... 11-179364
Jul. 9, 1999 (JP) .......................................... 11-195426

(51) Int. Cl.
*H04Q 7/20* (2006.01)

(52) U.S. Cl. ............... 455/456.4; 455/411; 455/404.1; 455/26.1; 455/436; 455/438; 455/439; 455/440; 455/565; 455/456.6; 340/7.1; 340/825

(58) Field of Classification Search ............... 455/436, 455/438, 439, 67.11, 440, 444, 443, 451, 455/404, 449; 340/7.1, 7.2, 7.39, 7.4, 825–49
See application file for complete search history.

(56) References Cited

U.S. PATENT DOCUMENTS

| | | | | |
|---|---|---|---|---|
| 6,011,973 | A * | 1/2000 | Valentine et al. | 455/456.6 |
| 6,052,577 | A * | 4/2000 | Taguchi | 455/411 |
| 6,122,486 | A * | 9/2000 | Tanaka et al. | 455/68 |
| 6,148,210 | A * | 11/2000 | Elwin et al. | 455/453 |
| 6,163,695 | A * | 12/2000 | Takemura | 455/456.4 |
| 6,188,883 | B1 * | 2/2001 | Takemura | 455/411 |
| 6,230,017 | B1 * | 5/2001 | Andersson et al. | 455/456.6 |
| 6,243,585 | B1 * | 6/2001 | Pelech et al. | 455/449 |
| 6,249,674 | B1 * | 6/2001 | Verdonk | 455/404.1 |
| 6,343,212 | B1 * | 1/2002 | Weber et al. | 455/404.1 |
| 6,343,213 | B1 * | 1/2002 | Steer et al. | 455/411 |
| 6,438,385 | B1 * | 8/2002 | Heinonen et al. | 455/501 |
| 6,459,891 | B1 * | 10/2002 | Whinnett et al. | 455/411 |
| 6,490,455 | B1 * | 12/2002 | Park et al. | 455/456.4 |
| 6,496,703 | B1 * | 12/2002 | da Silva | 455/456.4 |
| 6,600,914 | B1 * | 7/2003 | Uhlik et al. | 455/404.1 |
| 6,625,455 | B1 * | 9/2003 | Ariga | 455/565 |
| 6,785,533 | B1 * | 8/2004 | Ezuriko | 455/403 |

FOREIGN PATENT DOCUMENTS

| | | |
|---|---|---|
| JP | 10-032882 | 2/1998 |
| JP | 10-145864 | 5/1998 |
| JP | 10-276473 | 10/1998 |
| JP | 10-304430 | * 11/1998 |
| JP | 10304430 A | * 11/1998 |
| JP | 10-327474 | 12/1998 |
| JP | 11-008885 | 1/1999 |

* cited by examiner

*Primary Examiner*—Rafael Perez-Gutierrez
*Assistant Examiner*—Ismael Quiñones
(74) *Attorney, Agent, or Firm*—Knoble Yoshida & Dunleavy

(57) ABSTRACT

A terminal usage limiting apparatus for limiting the use of a portable telephone in a specific predetermined area. The terminal usage limiting apparatus 105 is installed to provide service to mobile terminals 101 in a usage limiting area 108. The terminal usage limiting apparatus 105 outputs control signals as a base station and additional usage limit messages. The terminal usage limiting apparatus 105 enables a mobile terminal 101 in the usage limiting area 108 to recognize the apparatus 105 as a base station so that the mobile terminal is switched from the base station to the apparatus 105. As a result, the mobile terminal 101 receives a usage limit message from the apparatus 105. Thus, the mobile terminal 101 enters into a predetermined operation limit mode where call originations are restricted. In addition, in this mode, the mobile terminal 101 receives control messages from the terminal usage limiting apparatus, and the control message includes a long code mask corresponding to the apparatus 105. Because of the unique long code mask, the mobile terminal 101 is also limited in receiving calls from the base stations 102 and 103 via the paging channel.

27 Claims, 21 Drawing Sheets

| # | PURPOSE | NUMBER |
|---|---|---|
| 1 | POLICE STATION | 110 |
| 2 | FIRE STATION | 119 |
| 3 | *** | XXX-XX-XXXXX |
| 4 | *** | YYY-YY-YYYYY |
| 5 | | |
| 6 | | |

FIG. 19

| # | BASE STATION | PILOT PN OFFSET 1901 | PILOT STRENGTH |
|---|---|---|---|
| 1 | BASE STATION 602 | XXX | aaa |
| 2 | BASE STATION 603 | YYY | bbb |
| 3 | BASE STATION AAA | ZZZ | ccc |
| 4 | BASE STATION BBB | WWW | ddd |
| 5 | *** | *** | *** |
| 6 | *** | *** | *** |

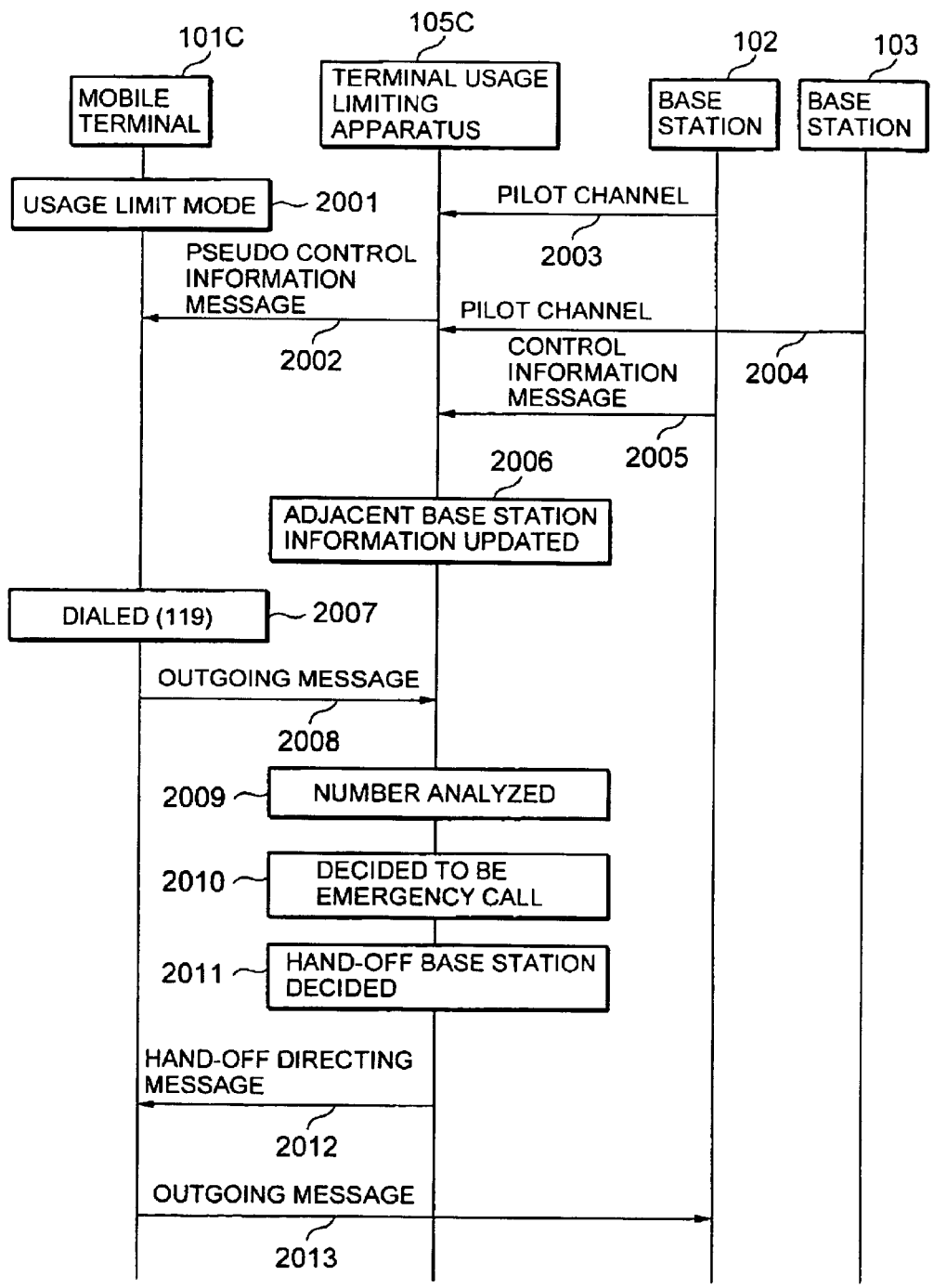

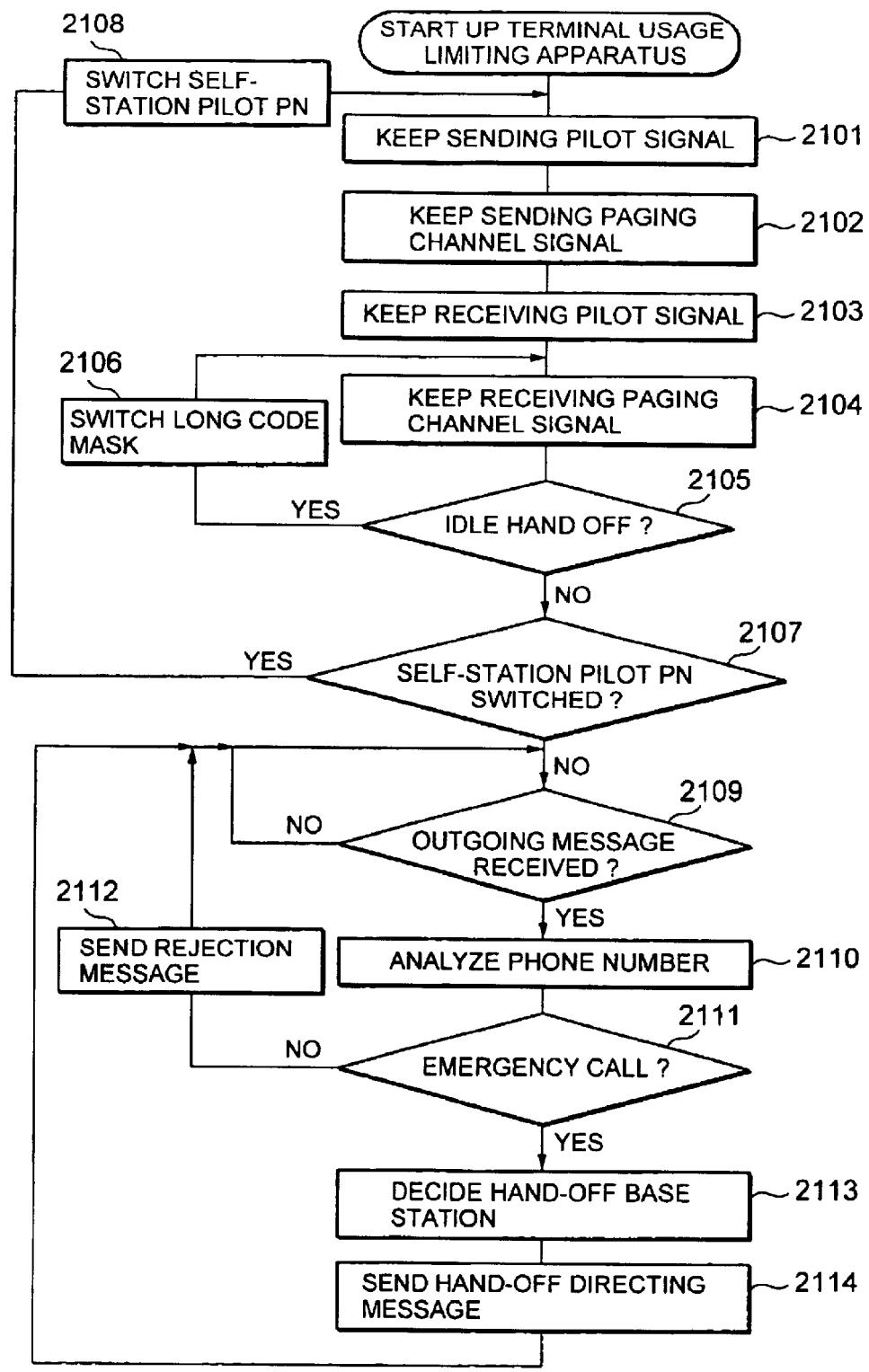

TERMINAL USAGE LIMITING APPARATUS

BACKGROUND OF THE INVENTION

The present invention relates to mobile communication systems, more particularly o a technique for limiting the usage of mobile terminals existing in a specific area.

In recent years, the usage of such mobile communication systems as portable telephones and PHS terminals is rapidly spreading due to the progress in communication technologies. On the other hand, problems are arising from such a rapidly increased usage of mobile communication systems. For example, since portable telephones are usable anywhere if they are connected to the base station, they are used in such restricted places as movie theaters, playhouses, concert halls and trains where the usage of those portable telephones should be eliminated.

To cope with the above problems, there has been a conventional counter measure by announcing to the users to restrain their portable telephone uses in the restricted places. In fact, there has been no other ways but to entrust the matter to the ethics of the users. Unfortunately, it is true that the users often give in to the convenience of their portable telephones and use them carelessly in those restricted places. Even when they are consciously restraining themselves to receive calls, they might possibly forget to turn off the power or to disable vibration/ring features.

In order to limit the usage of mobile communication systems in a certain restricted area, some techniques are disclosed in Japanese Patent Prepublication No.10-145864, No.10-276473, No.10-304430, No.10-327474, No.10-328882, and No.11-8885.

For example, in one technique to limit both originating and terminating mobile terminal signals by connecting an auxiliary system to a base station, the base station needs to be modified so as to connect to the auxiliary system. In addition, if such an auxiliary system is installed in a movie theater, a leased line must be connected to the base station from the movie theater. And accordingly, this technique has to confront an impossible problem to lay such a leased line in each of moving trains, etc.

SUMMARY OF THE INVENTION

In order to solve the above and other problems, a terminal usage limiting apparatus for temporary use with a mobile terminal communication, including a signal transmitter for transmitting a signal in a predetermined size of an area defining a restricted area where the use of the mobile terminal is restricted, the signal having a characteristic that is substantially indistinguishable from a predetermined characteristics of a base station, a message generator connected to the signal transmitter for generating the signal which includes information identifying the terminal usage limiting apparatus, an access channel demodulator for demodulating a signal that is received from the mobile terminal, a message analyzer connected to the access channel demodulator for analyzing the demodulated signal, a restricted phone number memory for storing a predetermined list of phone numbers that are allowed to call in the restricted area, an emergency call deciding device connected to the message analyzer and the restricted phone number memory for determining whether or not a requested phone number is an emergency call by comparing the requested phone number to the predetermined list in response to a call origination message from the message analyzer, a hand-off directing device connected to the emergency call device and the messsage generator for directing the message generator to generate an emergency call hand-off message to force the mobile terminal to switch from the terminal usage limiting apparatus to an available base station in response to the emergency call, the emergency call hand-off message including base station ID information on the available base station. According to the second aspect of the current invention, a mobile terminal for use in a restricted use area with a terminal usage limiting apparatus, including a receiver for receiving a signal for wireless communication, a restricted phone number memory unit for storing a list of predetermined emergency numbers, an emergency deciding device connected to the restricted phone number memory unit for determining whether or not a requested phone number is an emergency by comparing the requested phone number to the predetermined emergency numbers, a message generator connected to the emergency deciding device for generating an emergency signal indicative of emergency in response to the emergency deciding device, and a transmitter connected to the message generator for transmitting the emergency signal to the terminal usage limiting apparatus, in response to the emergency signal, the receiver information for forcing the mobile terminal to be switched from the terminal usage limiting apparatus to an available base station.

According to the third aspect of the current invention, a method of restricting the use of a mobile terminal in a predetermined area, including determining a unique station information on a terminal usage limiting apparatus for identifying a transmission source, storing a predetermined set of emergency calls, periodically transmitting to the mobile terminal a signal including the unique station information in a predetermined area, receiving a signal from the mobile terminal, determining whether or not the received signal is a call origination request to one of the predetermined set of the emergency calls, forcing the mobile terminal to switch from the terminal usage limiting apparatus to an available base station via a hand-off message in response to the determining step, and allowing the mobile terminal to retransmit the call origination request directly to the base station.

BRIEF DESCRIPTION OF THE DRAWINGS

FIG. 10 is an example of listing phone numbers that are not restricted for transmission in the restricted area in the embodiment according to the present invention.

FIG. 19 is an example of a neighbor base station information table in the embodiment according to the present invention.

FIG. 20 is an example of a message sequence for emergency calling from a mobile terminal which is located in a predetermined usage limiting area.

FIG. 21 is a flowchart illustrating the processing performed by the embodiment of the terminal usage limiting apparatus according to the present invention.

DESCRIPTION OF THE PREFERRED EMBODIMENTS

Hereunder, the preferred embodiments of the present invention will be described with respect to a CDMA mobile communication system with reference to the accompanying drawings.

Figure 1:
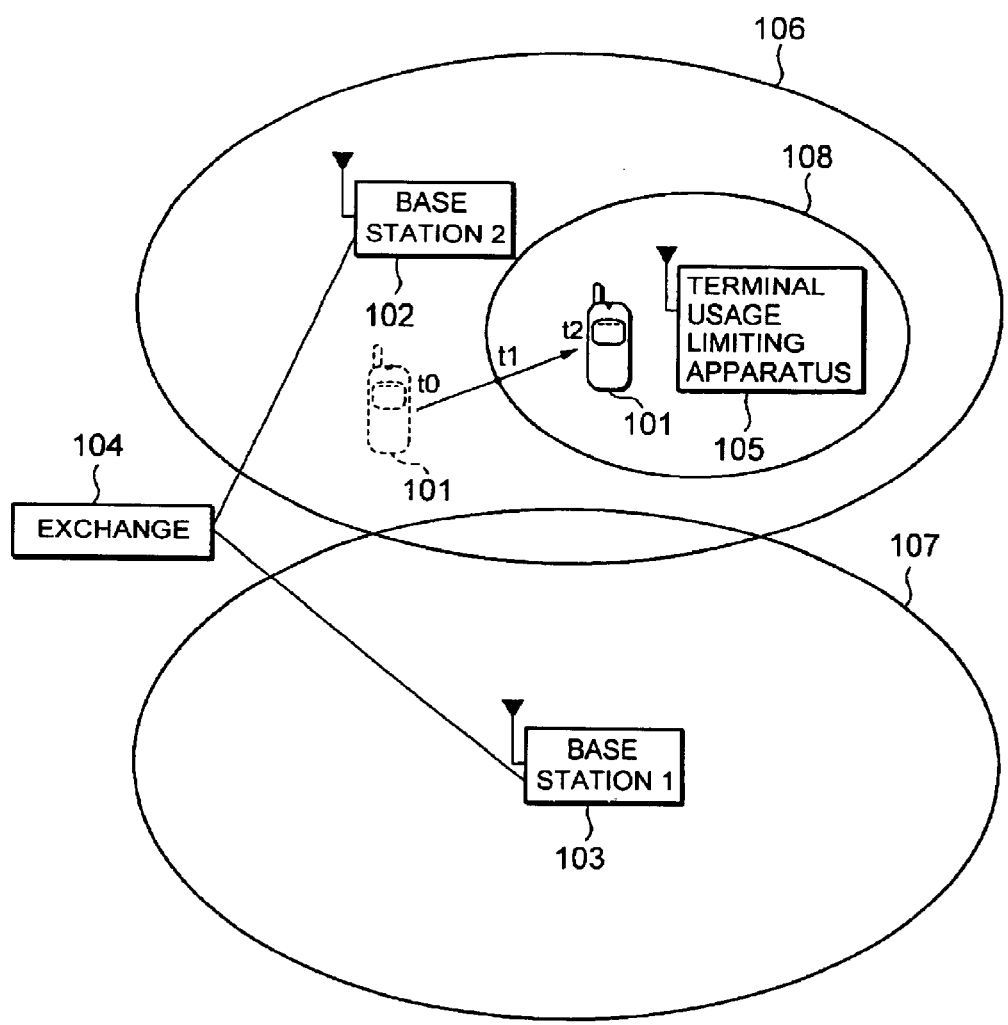
FIG. 1 is a block diagram illustrating an embodiment of the mobile communication system according to the present invention.

FIG. 1 shows a block diagram of the CDMA mobile communication system of the present invention. A mobile terminal 101 is assumed to move sequentially from a position at t0 to t2 via t1. Base stations 102 and 103 are connected to each other in a wireless manner. An exchange 104 is connected to both of the base stations 102 and 103 and is used to exchange communication lines with both a mobile network and a public network. A terminal usage limiting apparatus 105 is installed in a movie theater, a concert hall, a hospital, or the like and outputs specific control messages to the mobile terminal 101 so as to limit the usage thereof. The base station 102 provides communication services to the mobile terminal 101 located in a service area 106. The service area 107 is covered by the base station 103. A restricted area 108 is defined by a terminal usage limiting apparatus 105 which limits the usage of each mobile terminal 101 in the area 108.

In this example, the mobile terminal 101 is receiving control messages from the base station 102. In this state, the mobile terminal 101 at t0 can begin communication with another mobile terminal any time via the base station 102. On the other hand, the mobile terminal 101 receives control messages from the terminal usage limiting apparatus 105 respectively at t1 and t2 so that the terminal 101 is limited in communications as illustrated in one of the following embodiments.

(Embodiment 1)

In this embodiment, the mobile terminal 101 coming into the area 108 is switched to the terminal usage limiting apparatus 105 (idle handoff) so that the mobile terminal 101 is limited in usage. More concretely, the terminal usage limiting apparatus 105 sends base station ID information to the mobile terminal 101 via the pilot channel, then sends pseudo control messages to the terminal 101 via the paging channel. In this state, the terminal usage limiting apparatus 105, even when accessed from the mobile terminal 101, does not receive any control message via the access channel and ignores the message. The mobile terminal 101 is thus limited in usage.

The above pilot channel means a channel that is spreading-modulated by a Pilot PN offset which is different among base stations. The mobile terminal 101, when it is powered, first attempts to capture this channel. Then, the mobile terminal 101 measures the receiving strength of the pilot channel from an neighboring base station and uses the strength as a criterion for a handoff operation. The above paging channel means a channel used by each base station to send system information such as responses to messages to each mobile terminal 101. The above access channel means a channel used by each of the mobile terminal 101 to send messages to each base station. Originating requests and messages are sent via this channel.

The base ID information mentioned above is used to identify a base station or a terminal usage limiting apparatus. The information is a PN code offset applied to the target base stations or the terminal usage limiting apparatuses when a message is sent via the pilot channel. The PN code offset is a time delay from a system standard clock, and it denotes a start timing of a code. This PN code offset differs among the base stations.

Figure 2:
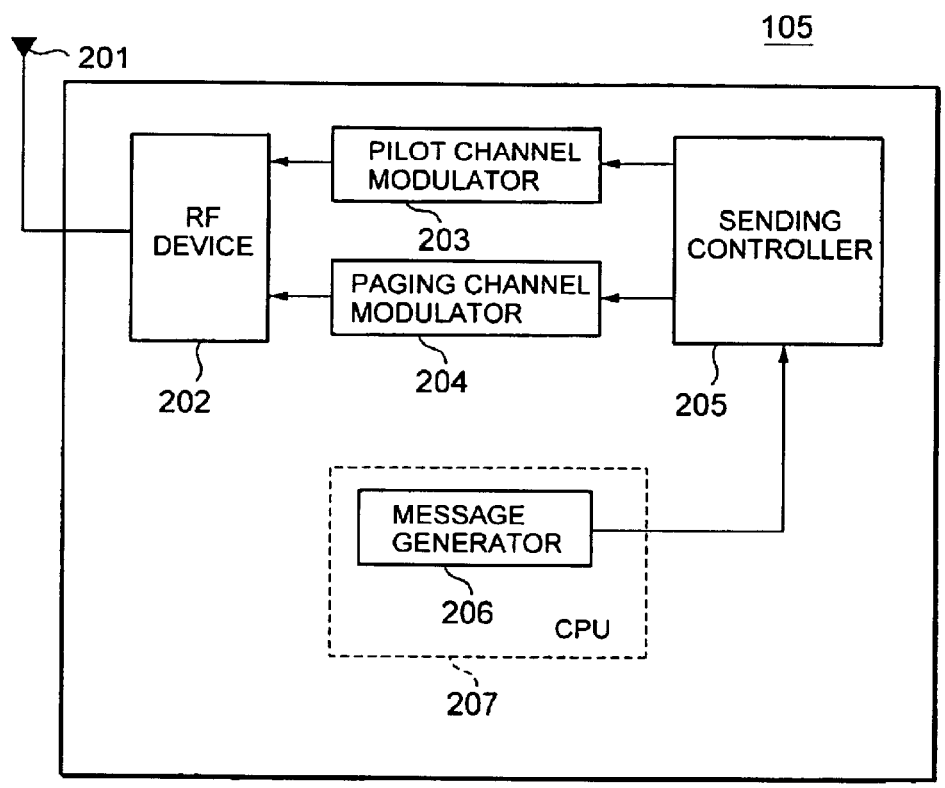
FIG. 2 is a block diagram illustrating the embodiment of a terminal usage limiting apparatus according to the present invention.

FIG. 2 shows a block diagram illustrating a preferred embodiment of the terminal usage limiting apparatus 105. The terminal usage limiting apparatus 105 is provided with an antenna device 201 for sending a radio signal; an RF device 202; a pilot channel modulator 203 for modulating a pilot signal to a radio signal and sending the radio signal to the RF device 202; a paging channel modulator 204 for modulating control messages sent via the paging channel to a radio signal and sending the radio signal to the RF device 202; a sending controller 205 for controlling sending of both pilot signal and control messages; a message generator for generating control messages and commanding the sending/receiving controller 205 to send the messages; and a controller (CPU) 207 including the message generator 206.

The pilot channel modulator 203 and the paging channel modulator 204 are used for spreading-modulation respectively with at least one spread code. For example, both of the modulators 203 and 204 assign the same spread code to identify a general radio base station as well as the terminal usage limiting apparatus 105. Another example is that both of the modulators 203 and 204 use a spread code set to each channel for spreading-modulation. A predetermined PN code offset is applied to such a spread code at this time. To identify each channel, both of the modulators 203 and 204 use an orthogonal code, etc. In any cases, the spread code may be set as needed according to the standards of the mobile communication system of the present invention when the terminal usage limiting apparatus is manufactured and/or installed.

Figure 3:
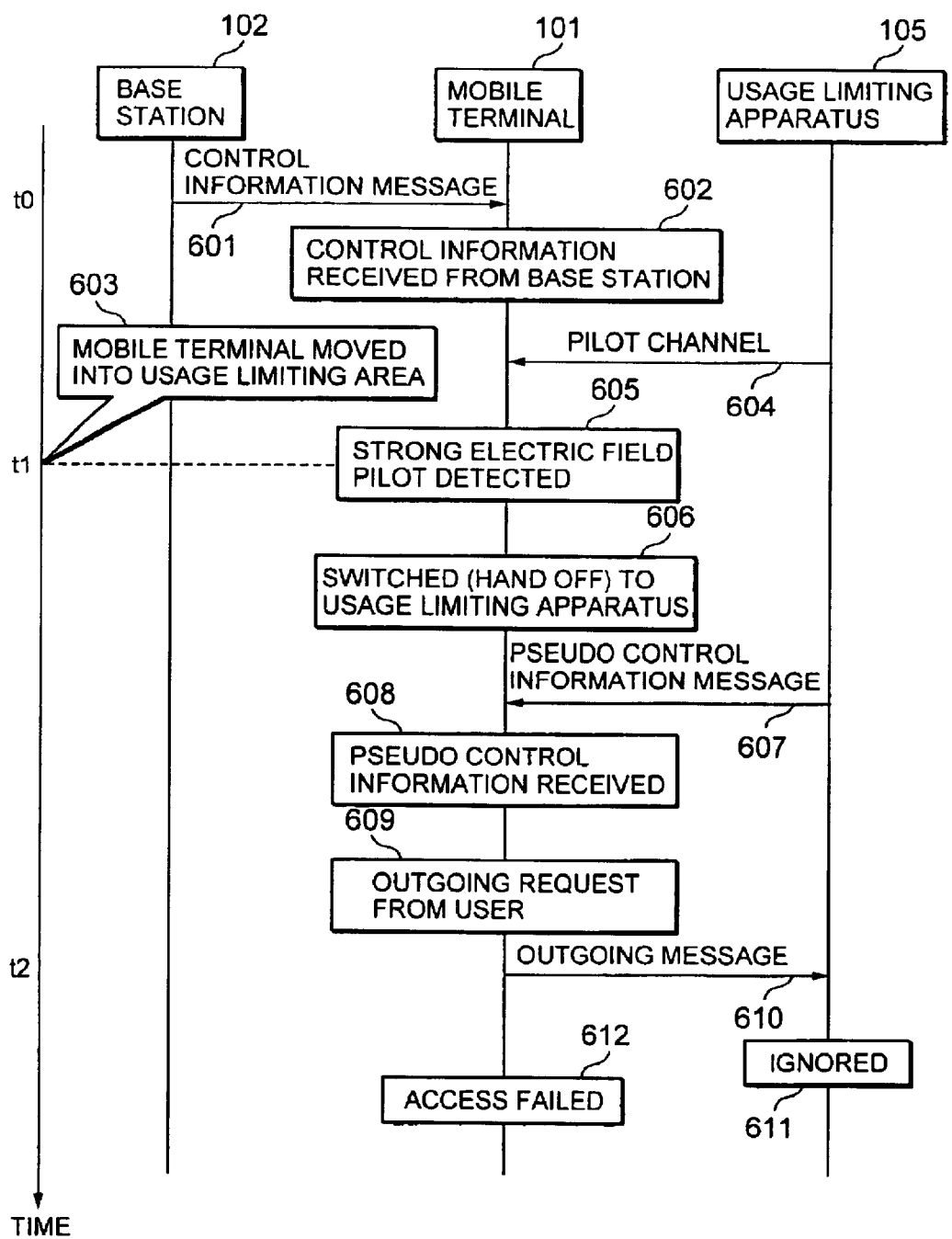
FIG. 3 is a message sequence performed by the embodiment according to the present invention.

FIG. 3 shows the signal processing sequence in the preferred embodiment the operation of the terminal usage limiting apparatus 105 before the mobile terminal 101 moves into the usage limiting area 108 where the usage of the terminal 101 is limited. At first, when the terminal usage limiting apparatus 105 is installed at a usage-limited place, the terminal usage limiting apparatus 105 sends a pilot signal to the mobile terminal 101 via the pilot channel at a sufficiently strong level to cover the entire area of the limiting area 108. In other words, the power of the pilot channel for sending the pilot signal is enough only to enable the mobile terminal 101 in the area 108 to be switched to the terminal usage limiting apparatus 105. This switch is termed as idle handoff. Concretely, the sending power value is decided with respect to the sending power value of the base station around the installation area. The idle handoff means switching a base station that waits for terminating to another at a non-talking time. It is different from switching a base station to another at a talking time. The pilot channel signal from the terminal usage limiting apparatus 105 is also referred to as a handoff prompt signal since it prompts the mobile terminal 101 to be autonomously switched to another base station (handoff).

Because the terminal usage limiting apparatus 105 looks like an ordinary base station to the mobile terminal 101, the idle handoff operation of the mobile terminal 101 becomes the same as the usual idle handoff from a base station to another. The base station 102 sends control messages to the mobile terminal 101 via the paging channel at a step 601. At time t0, the mobile terminal 101 receives various control messages 602 from the base station 102 via the paging channel, thereby it is synchronized with the mobile communication system. Concretely, the mobile terminal 101 is switched to the base station 102 (idle handoff) so that the mobile terminal 101 transmits and receives call originations via the base station 102.

Synchronization with the mobile communication system means a state in which the mobile terminal 101 comes into a service area from an outside service area so that it can receive messages from the base station or the terminal usage limiting apparatus 105.

The terminal usage limiting apparatus 105 lets the pilot channel modulator 203 spreading-modulate a pilot channel with use of a spread code having a Pilot PN offset that is different from those of neighboring base stations for generating a pilot signal. The terminal usage limiting apparatus 105 then converts the signal frequency to a radio frequency in the RF device 202 so as to send it from the antenna device 201 via pilot channel at a step 604. In addition, the terminal usage limiting apparatus 105 spreading-modulates pseudo control messages at a step 607 that have been generated by the message generator 206 in the paging channel modulator 204, then converts the message frequency to a radio frequency in the RF device 202 so as to send it from the antenna device 201.

The mobile terminal 101 searches the pilot channels of the neighboring base stations and the terminal usage limiting apparatus 105 and measures the strength of each pilot channel, subsequently, the mobile terminal 101 moves in the direction indicated by the vertical arrow towards the point of time t1 when the mobile terminal 101 is in an usage limited area in a step 603. The mobile terminal 101 detects that the pilot channel from the terminal usage limiting apparatus 105 is stronger than those of other neighbor base stations 102 at a step 605. Because the terminal usage limiting apparatus 105 looks like a base station from the mobile terminal 101, the mobile terminal 101 is switched to the terminal usage limiting apparatus 105 (idle handoff) upon the detection of the pilot channel with the electrical field that is stronger than that of neighboring base stations at a step 606. In this state 608, the mobile terminal 101 is synchronized with the mobile communication system by receiving pseudo control messages from the terminal usage limiting apparatus 105.

Next, the mobile terminal 101, receiving an originating request from a user in a step 609, sends an originating message to the user via the access channel in a step 610, but the terminal usage limiting apparatus 105 ignores the message in the access channel in a step 611. The mobile terminal 101 cannot thus receive the acknowledgement to the message. Consequently, the mobile terminal 101 fails to access the base station and becomes limited in originating a call in a step 612.

There are some other method for ignoring the access channel. For example, one of the methods is to avoid any access channel demodulator in the terminal usage limiting apparatus 105. Another method is to suppress actual demodulation by an access channel decoder if it is formed in the terminal usage limiting apparatus 105 or compose the terminal usage limiting apparatus 105. If an originating message is demodulated, the access channel demodulator is reset to the normal terminal limit mode thereafter.

The terminal usage limiting apparatus 105 also limits terminating messages to the mobile terminal 101 from a base station. In this state, the mobile terminal 101 is switched to the terminal usage limiting apparatus 105 (idle handoff). At this time, the mobile terminal 101 identifies the spread code which is used by the terminal usage limiting apparatus 105 based upon the pilot channel signal which is also sent from the terminal usage limiting apparatus 105 and sets this spread code in the paging channel spreading demodulator.

The mobile terminal 101, because a spread code is different from that of the base station 102 cannot back-spreading-modulate the paging channel of the base station 102 at the step 612. This is due to a technical concept that limits terminating by making the most use of the characteristics of the mobile terminal 101, which receives messages only from a base station to which the mobile terminal 101 is switched (idle handoff). According to this method of limiting the use of mobile terminals, it does not need to modify the mobile terminal.

(Embodiment 2)

Figure 4:
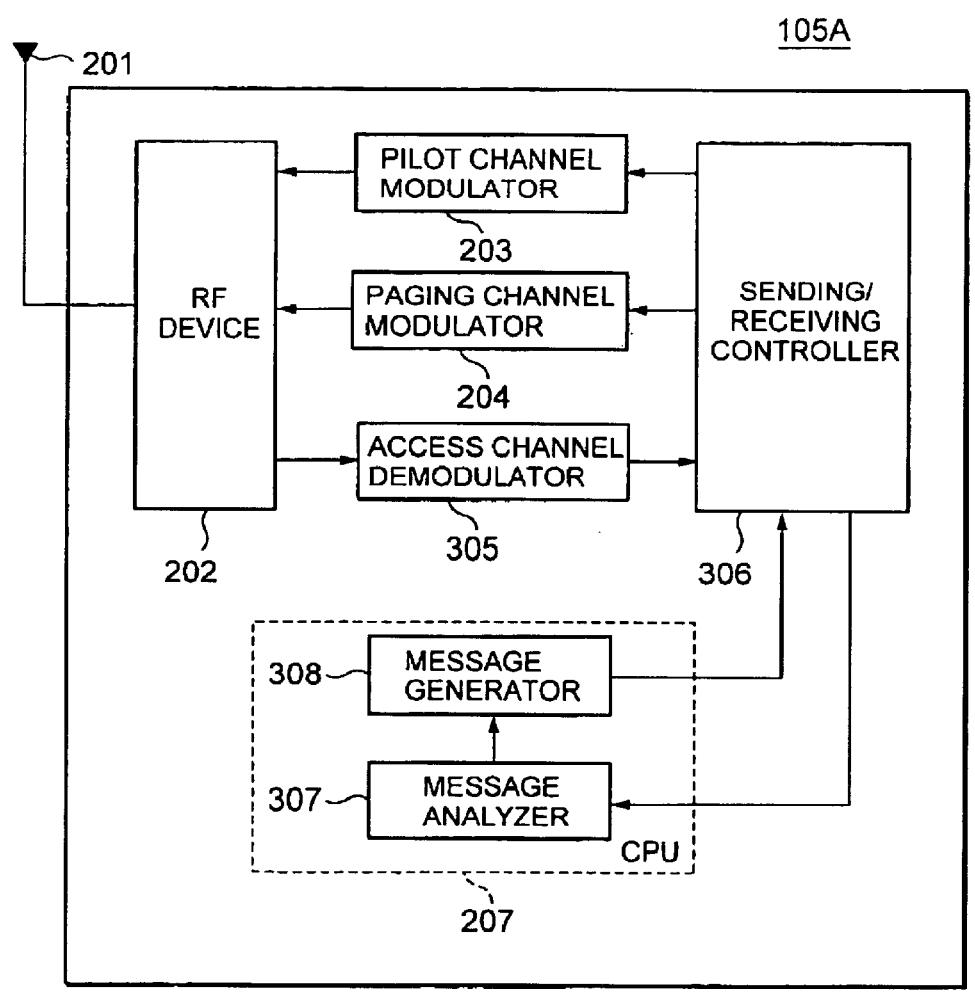
FIG. 4 is another block diagram illustrating the embodiment of the terminal usage limiting apparatus according to the present invention.

FIG. 4 is another block diagram illustrating a second preferred embodiment of the terminal usage limiting apparatus 105A according to the current invention. The terminal usage limiting apparatus 105A in this embodiment is provided with a function for receiving the access channel signal in addition to the function for outputting both pilot and paging channel signals. In this embodiment, if the terminal usage limiting apparatus 105A is accessed by a mobile terminal, the terminal usage limiting apparatus 105A returns a rejection message to the mobile terminal, thereby limiting the mobile terminal usage. This method can also limit existing mobile terminals in usage.

In FIG. 4, the terminal usage limiting apparatus 105A is provided with an access channel demodulator 305 for demodulating the radio signal of the access channel received from the RF device 202; a sending/receiving controller 306 for controlling sending of the pilot signal and the control messages in the paging channel and receiving of control messages in the access channel; and a controller (CPU) 207. The controller 207 includes a message analyzer 307 for analyzing output messages from the sending/receiving controller 306; and a message generator 308 for generating a rejection message and directing the ending/receiving controller 306 to send the message if directed by the message analyzer 307 to return the rejection message.

Figure 5:
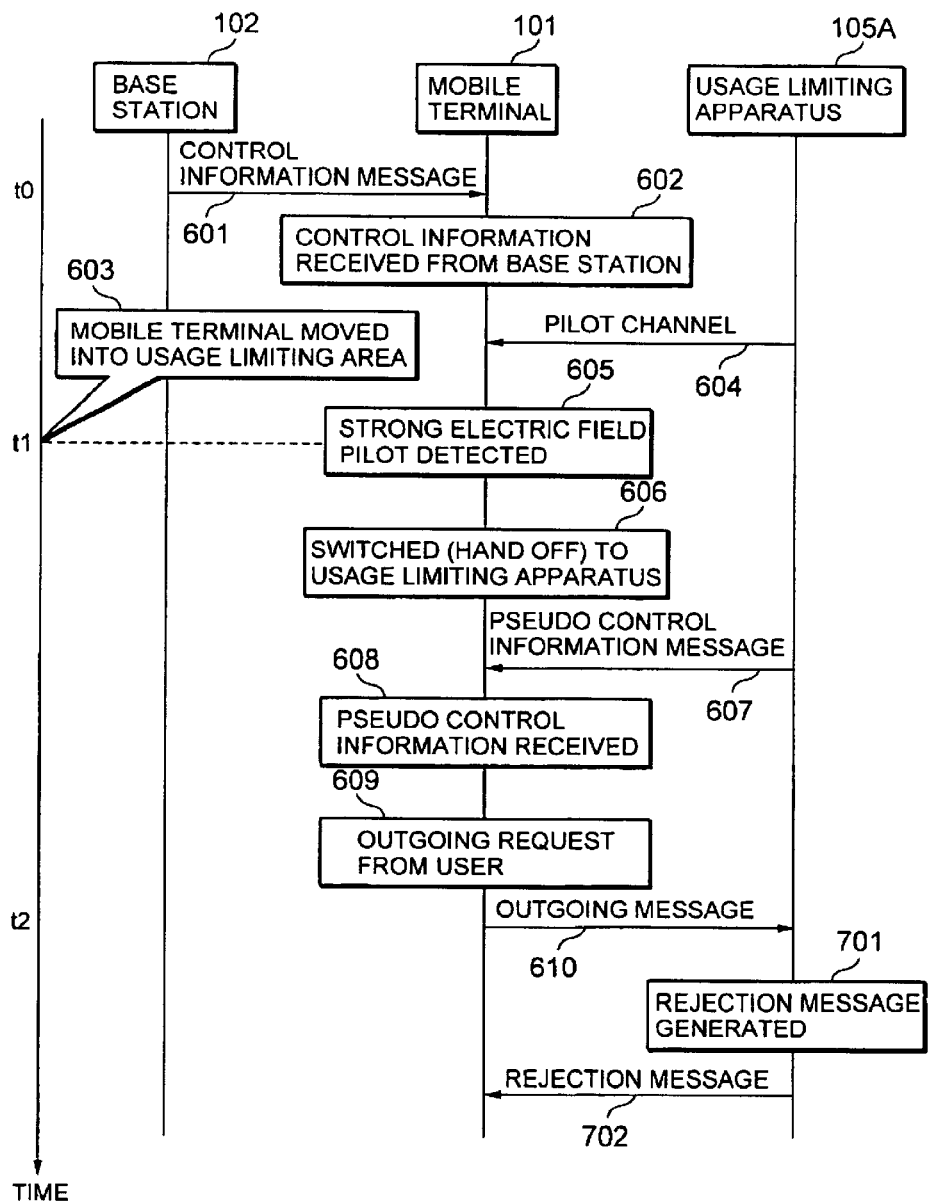
FIG. 5 is another message sequence performed by the embodiment according to the present invention.

FIG. 5 shows a signal sequence executed by the second preferred embodiment. The same items as those in the sequence shown in FIG. 3 will be omitted here to simplify the description. At first, receiving an originating request from a user at a step 609, the mobile terminal 101 starts sending of a message via the access channel in a step 610. The sending/receiving controller 306 directs the access channel demodulator 305 to demodulate the access channel signal sent from the mobile terminal 101, extracts the message, and sends the extracted message to the message analyzer 307. Deciding the message from the mobile terminal 101 to be a call origination message, the message analyzer 307 directs the message generator 308 to generate a rejection message in a step 701. The message generator 308, finishing the generation of the rejection message according to the command from the message analyzer 307, outputs the rejection message to the sending/receiving controller 306. The sending/receiving controller 306 spreading-modulates the rejection message in the page channel modulator 204, thereby generating a paging channel signal to convert the frequency of the message in the RF device 202 and sends the result to the mobile terminal 101 via the antenna device 201 in a step 702. Consequently, the use of the mobile terminal 101 is limited.

And, because the mobile terminal 101 receives control messages from the terminal usage limiting apparatus 105A with use of the spread code of the terminal usage limiting apparatus 105A, the terminal 101 cannot receive messages via the paging channel from the base station, thereby it is also limited in receiving calls. This method also requires no special modification to the mobile terminal.

(Embodiment 3)

Figure 6:
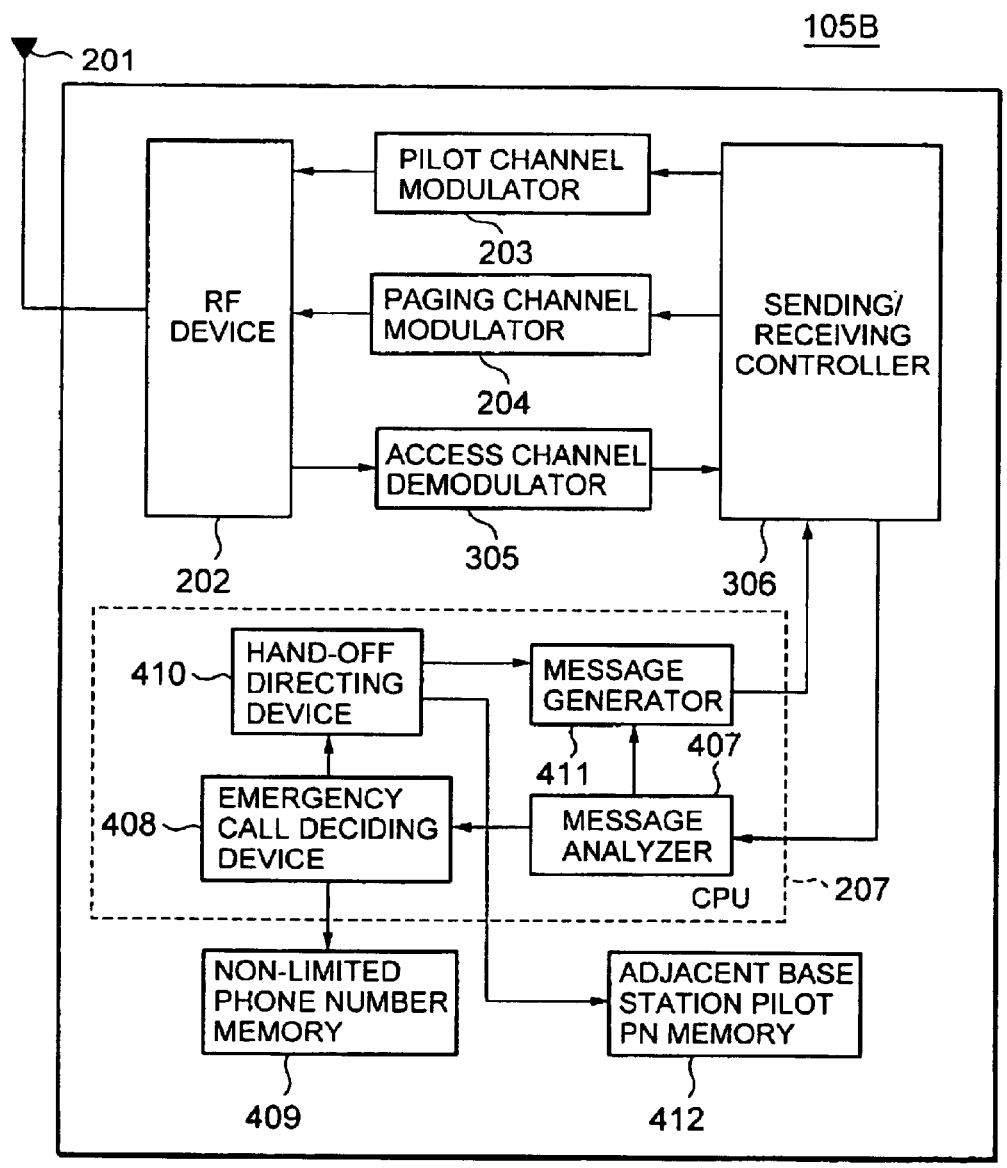
FIG. 6 is still another block diagram illustrating the embodiment of the terminal usage limiting apparatus according to the present invention.

FIG. 6 is a still another block diagram of a third preferred embodiment of the terminal usage limiting apparatus 105B according to the present invention. In the third preferred embodiment, the terminal usage limiting apparatus 105B is provided with a non-limited phone number memory 409 for storing a list of phone numbers including emergency ones; and an neighbor base station pilot PN memory 412 that is referenced by a handoff directing device 410 to decide a target base station for the handoff operation. The phone number memory 409 is provided alternatively in the mobile terminal. The controller 207 is provided with a message analyzer 407 for analyzing a message in response to a command received from the sending/receiving controller 306; an emergency call deciding device 408 for deciding whether or not an emergency call indicator is set in a received message if the message is an originating one. The emergency call deciding device 408 also decides whether or not a received message is an emergency call according to whether or not the receiver number in the received originating message is listed in the non-limited phone number memory. The controller 207 further includes a handoff directing device 410 for switching the mobile terminal (handoff) to a normal neighbor base station if the emergency call deciding device 408 decides that the call is an emergency call; and a message generator 411 for generating a message and directing the sending/receiving controller 306 to send the message.

An emergency index means information stored in the emergency call indicator field in an originating message. The information denotes whether or not the received call is an emergency call. For example, for a normal call, "0" may be set in the field and for an emergency call, "1" may be set in the field.

Figure 7:
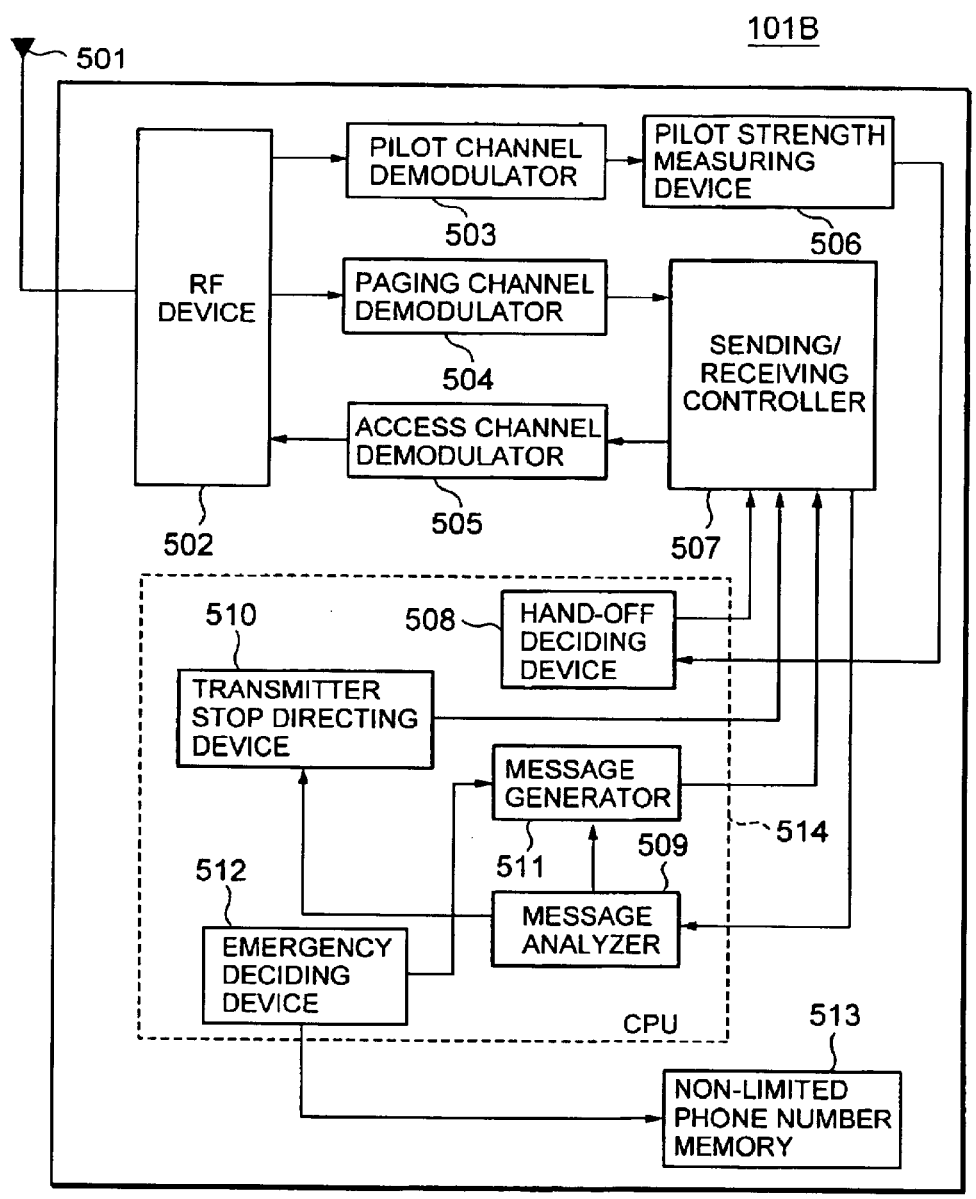
FIG. 7 is a block diagram illustrating the embodiment of a mobile terminal according to the present invention.

FIG. 7 is a block diagram illustrating a corresponding preferred embodiment of the mobile terminal 101 for the third preferred embodiment of the terminal usage limiting apparatus 105B according to the current invention. The mobile terminal 101B is provided with an antenna device 501 for sending/receiving a radio signal; an RF device 502 for converting the frequency of a signal; a pilot channel demodulator 503 for demodulating the signal in the pilot channel; a paging channel demodulator 504 for demodulating the radio signal in the paging channel; an access channel modulator 505 for modulating control messages to be sent via the access channel to radio signals and sending the signals to the RF device 502; a pilot strength measuring device 506 for measuring the strength of the received pilot signal; a sending/receiving controller 507 for controlling sending/receiving of messages; a non-limited phone number memory 513 for storing unrestricted phone numbers such as emergency and a controller (CPU) 514.

The controller or CPU 514 is provided with a handoff deciding device 508 for deciding whether or not to switch (handoff) a target mobile terminal to the object according to the pilot strength measured by the pilot strength measuring device 506; a message analyzer 509 for analyzing messages received from the sending/receiving controller 507; and a transmitter stop directing device 510 for directing the sending/receiving controller to stop the transmitter if the message analyzed by the message analyzer 509 is a usage limit message. The controller 514 further includes a message generator 511 for generating messages including originating messages; and an emergency call deciding device 512 for deciding whether or not a dialed phone number is an unrestricted phone number such as an emergency number as stored in the non-limited phone number memory 513 as well as for directing the message generator so as to generate an originating message in which an emergency call indicator is set for emergency. Both the unrestricted phone number memory 513 and the emergency deciding device 512 is alternatively included in the terminal usage limiting apparatus 105 in lieu of the mobile terminal 101. The transmitter mentioned above is a part of the mobile terminal 101 and is located between the RF device 502 and the sending/receiving controller 507 that are related to sending signals. On the other hand, the receiver means is also a part of the mobile terminal 101 and is located between the RF device 502 and the sending/receiving controller 507 that are related to receiving signals in FIG. 7.

Figure 8:
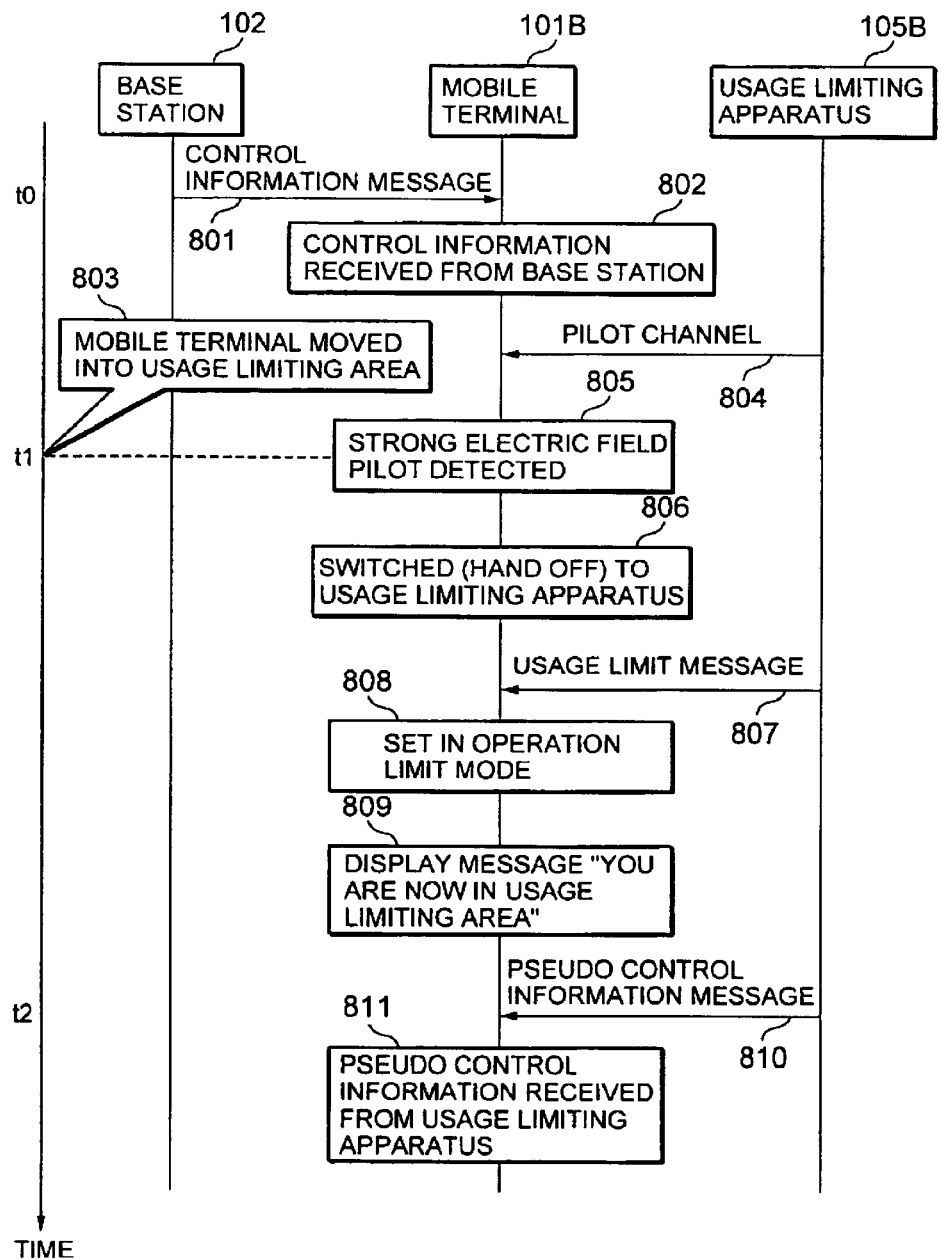
FIG. 8 is still another message sequence performed by the embodiment of the present invention.

FIG. 8 shows a sequence of signals sent or received among a base station, a mobile terminal, and a terminal usage limiting apparatus and their associated operations. The base station 102 sends control messages via the paging channel at a step 801. The mobile terminal 101B searches the pilot channels from neighboring base stations at proper cycles, and the pilot strength measuring device 506 measures each pilot channel strength. At time t0, the mobile terminal 101B receives a signal via the paging channel from the base station and converts the signal frequency in the RF device 502. Then, the paging channel demodulator 504 back-spreading-demodulates the signal, and the mobile terminal 101B receives control messages from the base station in a step 802. The mobile terminal 101B is synchronized with the base station 102 in the mobile communication system according to these control messages. Thereby the mobile terminal 101B communicates freely with other mobile terminals via the base station 102.

On the other hand, the terminal usage limiting apparatus 105 sends a pilot signal including a pilot offset that is different from those of the pilot signals from the neighboring base stations in a step 804. The mobile terminal 101B moves in the direction of the vertical arrow, and the pilot strength measuring device 506 detects the sufficiently detectable pilot signal from the terminal usage limiting apparatus 105 in a step 805. Upon detecting the pilot channel with a strong electrical field, the handoff deciding device 508 decides to switch the target mobile terminal 101 (idle handoff) to the terminal usage limiting apparatus 105 in a step 806.

The message generator 411 generates a usage limit message for limiting the usage of the mobile terminal 101B. The usage limit message is a so-called command signal for inhibiting the transmission from the mobile terminal 101B. A command signal may also be added to the usage limit message so as to direct the receiver of the mobile terminal 101B to receive messages at longer-than-usual intervals. This enables the mobile terminal 101B to reduce redundant operations to save the power consumption.

The sending/receiving controller 306 outputs a usage limit message to the page channel modulator 204, and the page channel modulator 204 spreading-modulates the usage limit message to generate a paging channel message. The generated paging channel message is sent out via both the RF device 202 and the antenna device 201 in a step 807.

The sending/receiving controller 507 of the mobile terminal 101B receives a usage limit message from the terminal usage limiting apparatus 105 and sends the message to the message analyzer 509. When the message analyzer 509 decides the message to be a sending stop command, the message analyzer 509 directs the transmitter stop directing device 510 to stop the transmission. The transmitter mentioned here denotes mainly a channel modulator. The transmitter stop directing device 510 directs the sending/receiving controller 507 to stop the transmission. The sending/receiving controller 507 thus enters the sending limit mode in a step 808. The mobile terminal 101B displays a message denoting that the present place is within the usage limiting area or the restricted area on the display screen in a step 809.

If the message analyzer 509 decides the message to be an intermittent operation command to the receiver, the message generator 511 directs the sending/receiving controller 507 so as to set longer intervals for the receiver to wait for messages. The receiver mentioned here means mainly a channel demodulator.

Figure 9:
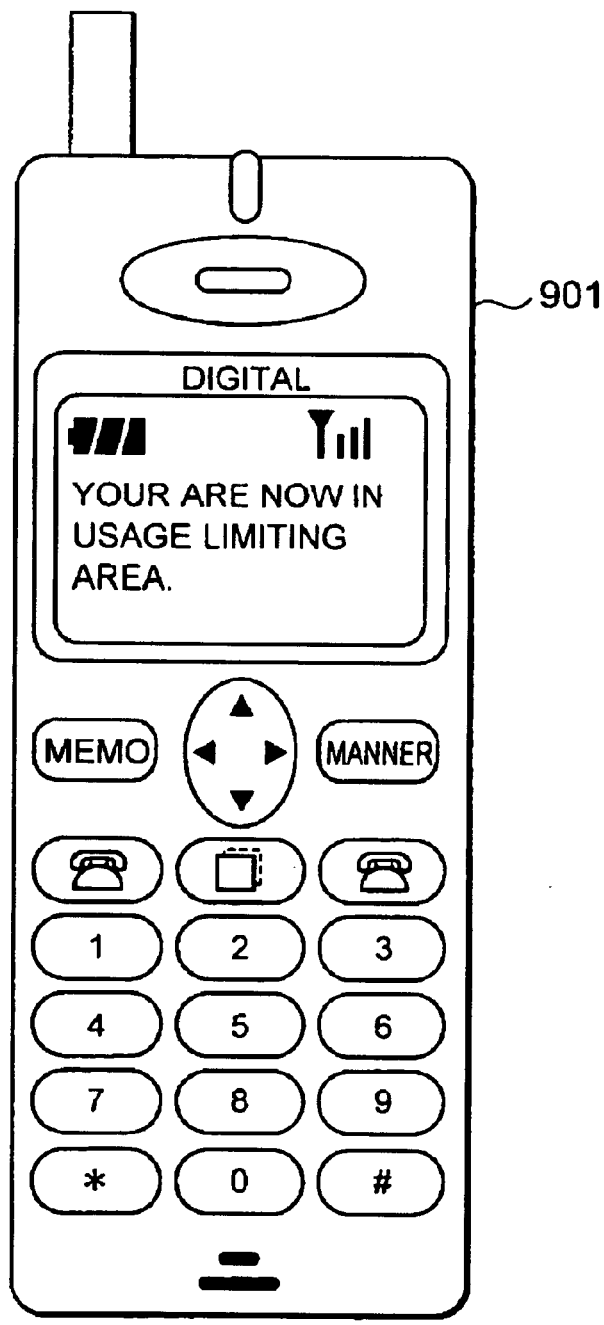
FIG. 9 is an example of a display for limiting the terminal usage in the embodiment according to the present invention.

FIG. 9 shows an example of displaying a message when a target mobile terminal 901 is within a usage limiting area. The mobile terminal 901, when moving into the usage limiting area and receiving a usage limit message from a terminal usage limiting apparatus, displays a message such as "You are now within a usage limiting area", etc. on the screen. Instead of such a display, the message is alternatively an audible voice message. If the mobile terminal 901 is provided with a vibrator for notifying of the disabled calls, the message arrival is notified with a predetermined type of vibration. In this case, the vibration is distinguished from that of normal calls so that the user is now within a usage limiting area.

Referring back to FIG. 8, the page channel modulator 204 of the terminal usage limiting apparatus 105 spreading-modulates pseudo control messages in the message generator 411. The page channel message is sent from the antenna 201 in a step 810. Whenever the mobile terminal 101B is in the limited or restricted operation mode, the transmitter is disabled. Thus, the mobile terminal 101B does not send out an originating message in response to any call request from users except for the emergency calls as described below. Even in the restricted state, the receiver keeps receiving pseudo control messages 810 from the terminal usage limiting apparatus 105 as shown in a step 811. Consequently, the mobile terminal 101B is kept synchronized with the mobile communication system so as to allow emergency calls any time.

Furthermore, because the mobile terminal 101B receives control messages from the terminal usage limiting apparatus 105, the mobile terminal 101B is designed to limit incoming calls without terminating messages via the paging channel from the base station 102. In addition, if the mobile terminal 101B leaves the usage limiting area, the mobile terminal 101B is switched (handoff) to a normal base station and returns to the normal operation mode. According to this method, the mobile terminal 101B must be modified, but the mobile terminal can be limited completely in sending messages.

(Embodiment 4)

In a fourth preferred embodiment, even when the mobile terminal is within a usage limiting area, the terminal is enabled for specific communications. This is to enable emergency calling, etc. even while the terminal is limited in usage. FIG. 10 shows an unrestricted phone number list 1001 stored in the mobile terminal or in the terminal usage limiting apparatus. This table enables call originations for the stored numbers even when the mobile terminal is within a usage limiting area. The non-limited or unrestricted phone number list 1001 stores phone numbers for emergency calling such as those of the police station, the fire station, etc.

Figure 11:
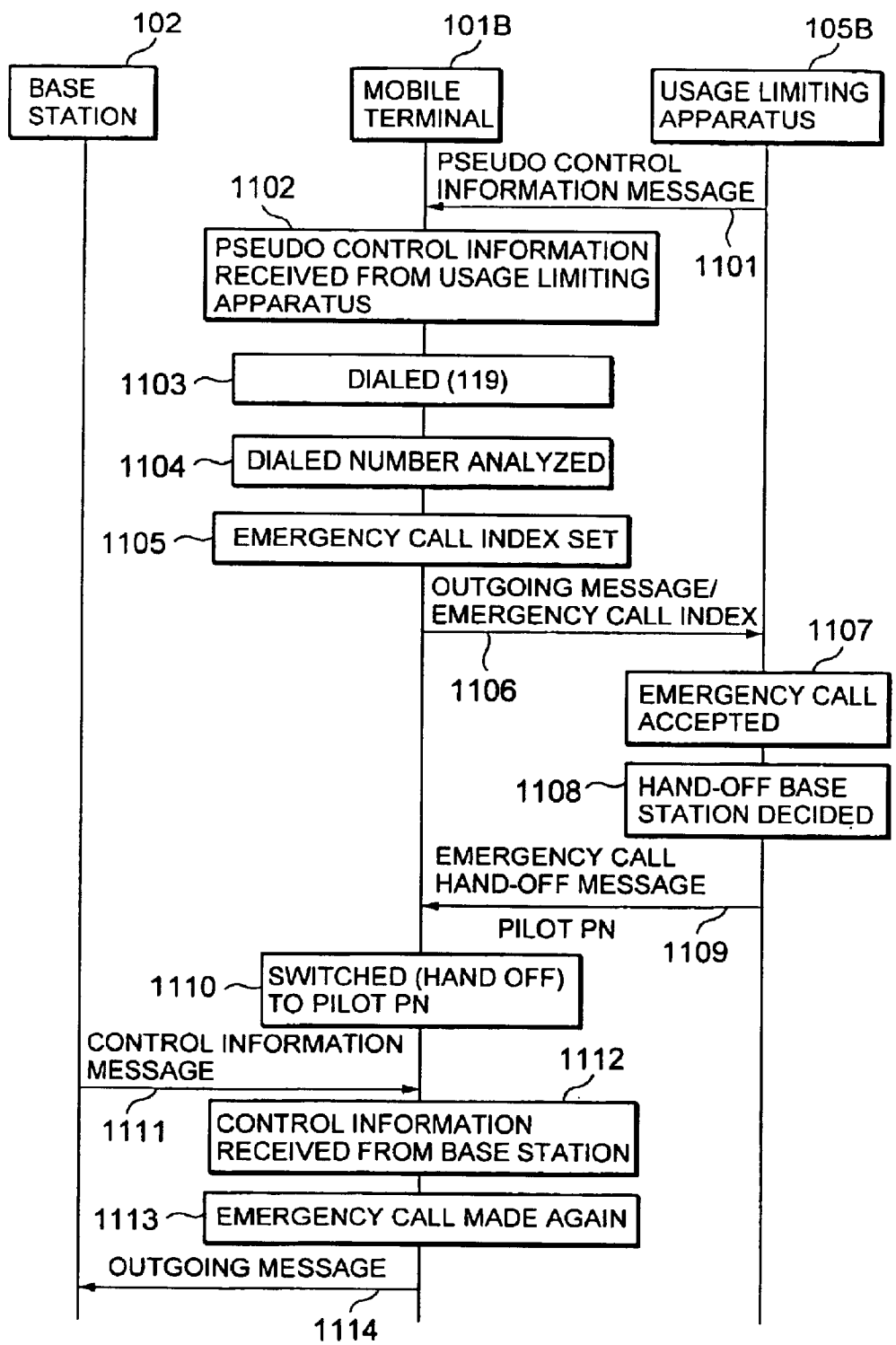
FIG. 11 is an example of a message sequence for emergency calling in the embodiment according to the present invention.

FIG. 11 shows a sequence for a call origination for a non-limited phone number when the non-limited phone number list 1001 is stored in a mobile terminal 101B as shown in FIG. 7. The mobile terminal 101B is now in the operation limit mode so that it cannot make normal call originations. The terminal usage limiting apparatus 105 sends pseudo control messages to the mobile terminal 101B periodically in a step 1101. The mobile terminal 101B is thus synchronized with the mobile communication system by receiving those pseudo control messages in a step or state 1102.

At first, if a user dials an emergency phone number in a step 1103, the emergency call deciding device 512 analyzes the dialed number by comparing it with the numbers in the non-limited phone number list 1001 stored in the non-limited phone number memory 513 in a step 1104. In this case, assuming that the dialed number is included in the non-limited phone number list 1001 stored in the non-limited phone number memory 513, the emergency call deciding device 512 recognizes it as an emergency call and directs the message generator 511 to generate a message in which an emergency call indicator is set in a step 1105.

Still referring to FIG. 11, the message generator 511 thus generates a message with an emergency call indicator and requests the sending/receiving controller 507 to send the message. The sending/receiving controller 507 then activates the transmitter so as to send the originating message to the terminal usage limiting apparatus 105 via the access channel modulator 505 in a step 1106.

The terminal usage limiting apparatus 105 detects the emergency call indicator in the originating message that is received at the message analyzer 407 via the access channel demodulator 405 and accepts the emergency call in a step 1107. The handoff directing device 410 of the terminal usage limiting apparatus 105 selects the base station 102 that directs handoff from the neighboring base station pilot PN memory that holds neighboring base station information in a step 1108. Usually, the handoff directing device 410 selects a base station with the strongest receiving power pilot channel. The message generator 411 then generates a handoff message for emergency calling so as to command an emergency call handoff. This message includes a pilot PN sequence offset of the base station to which the mobile terminal 101 is switched (handoff). The emergency call handoff message is spreading-modulated in the paging channel modulator 204 and is then sent to the mobile terminal 101B via the antenna device 201 in a step 1109.

Receiving the emergency call handoff message in the message analyzer 509 via the paging channel demodulator 504, the mobile terminal 101B is switched (handoff) to the base station having the pilot PN sequence offset specified by this message in a step 1110. Concretely, the mobile terminal 101B sets the pilot PN sequence offset that is specified by the message in the pilot channel demodulator as a spread code for spreading-modulation.

After the handoff operation, the mobile terminal 101B receives a control message from the base station 102 so as to finish updating of the control message held therein, the mobile terminal 101B enters the enabled state for communications with the base station in both originating and terminating in steps 1111 and 1112. Next, the message generator 511 generates an originating message including the previously dialed number so as to make an emergency call again in a step 1113. The access channel modulator 505 then spreading-modulates the message. The RF device 502 converts the message frequency as needed and sends the message out in a step 1114. Hereafter, the call setting procedure is the same as that of the normal call.

Figure 12:
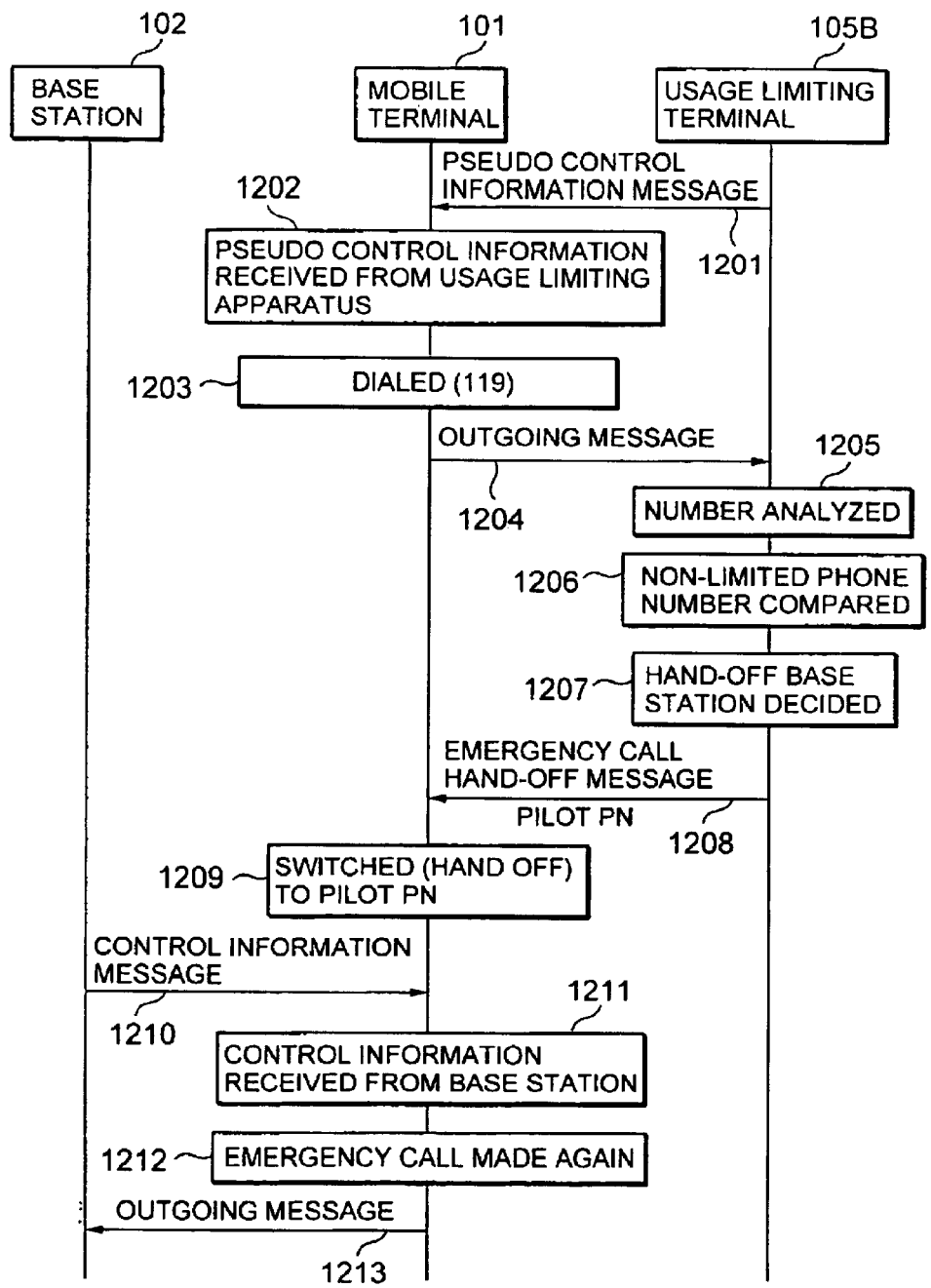
FIG. 12 is an example of another message sequence for emergency calling in the embodiment according to the present invention.

FIG. 12 shows a sequence for making a call of a non-limited phone number when the non-limited phone number list is stored in the terminal usage limiting apparatus 105B as shown in FIG. 6. The terminal usage limiting apparatus 105B periodically outputs pseudo control messages to the mobile terminal in a step 1201. The mobile terminal 101 is synchronized with the mobile communication system by receiving those pseudo control messages in a step 1202. Assume now that a user dials an emergency call number in a step 1203, the message generator 511 of the mobile terminal 101 then generates an originating message and directs the sending/receiving controller 507 to send the message. The sending/receiving controller 507 sends the message to the terminal usage limiting apparatus 105 via the access channel modulator 505 in a step 1204. On the other hand, the message analyzer 407 of the terminal usage limiting apparatus 105B that has received the originating message via the access channel demodulator 405 passes the dialed number in the originating message to the emergency call deciding device 408. The emergency call deciding device 408 then analyzes the dialed number in a step 1205 and compares it with the non-limited phone number list stored in the non-limited phone number memory 409 in a step 1206. In this case, assuming that the dialed number is included in the non-limited phone number list stored in the non-limited phone number memory 409, the emergency call deciding device 408 recognizes the call as an emergency one and notifies the effect to the handoff directing device 410. The handoff directing device 410 then selects a base station to which the handoff is directed in a step 1207 from the neighboring/adjacent base station pilot PN memory 412 that holds neighbor base station information. The message generator 411 then generates an emergency call handoff message denoting a pilot PN sequence offset of the base station for an emergency call handoff and directs the sending/receiving controller 406 to send the message. The sending/receiving controller 406 then sends the emergency call handoff message to the mobile terminal 101 via the paging channel modulator 404 in a step 1208. On the contrary, receiving the emergency call handoff message at the message analyzer 509 via the paging channel demodulator 504, the mobile terminal 101 is switched (handoff) to the base station having the pilot PN sequence offset that is specified by the message in a step 1209. After the handoff, the mobile terminal 101 receives control messages from the base station 102 in steps 1210, 1211. After updating all the control messages, the message generator 511 generates an originating message including the previously dialed number in a step 1212. The RF device 202 converts the message frequency as needed and sends the message to the base station 102 in a step 1213. Hereafter, the call setting procedure is the same as a usual call.

Figure 13:
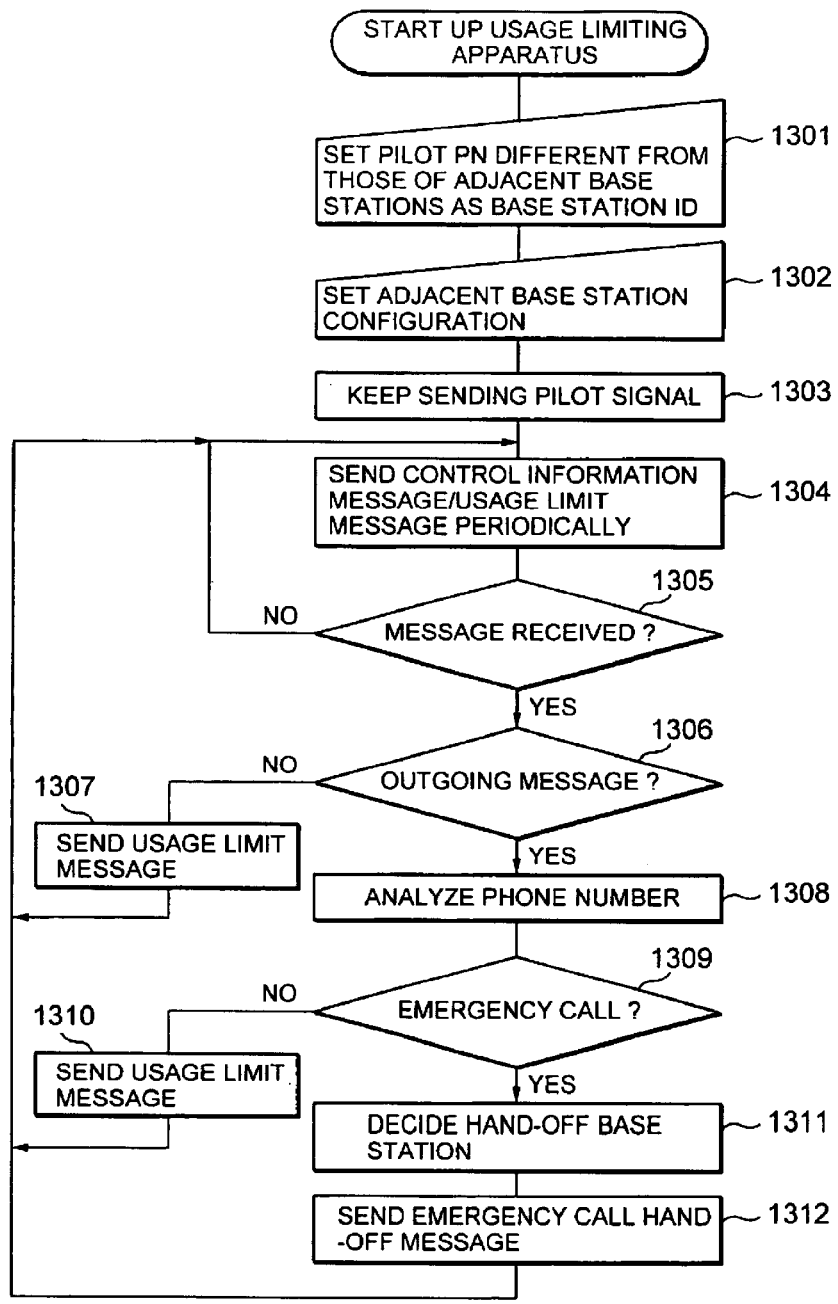
FIG. 13 is a flowchart illustrating the processing performed by the embodiment of the terminal usage limiting apparatus according to the present invention.

Next, the operation of the terminal usage limiting apparatus 105 of the present invention will be described with reference to FIG. 13. When the terminal usage limiting apparatus 105 is installed in the usage limiting area 108, the mobile terminal 101 must be switched (handoff) to the terminal usage limiting apparatus 105 in the same way that the mobile terminal 101 is switched to a normal base station. Therefore, the terminal usage limiting apparatus 105 has a distinct code such as 111 that is different from those of the neighbor base stations to distinguish the pilot signal in a step 1301. This code may be established when the terminal usage limiting apparatus 105 is manufactured or installed. The code of the terminal usage limiting apparatus 105 is also established by taking the neighbor base stations into consideration.

After that, the terminal usage limiting apparatus 105 stores system parameters and configuration information of the neighbor base stations that are used to send control messages and accept emergency calls in a step 1302. The terminal usage limiting apparatus 105 then sends the pilot signal to which the set 111 is applied in a step 1303. In addition, the terminal usage limiting apparatus 105 periodically sends both control messages and usage limit messages to the broadcast addresses via the paging channel in a step 1304. A receiving system, when receiving a message in a step 1305, decides whether or not it is an originating message in a step 1306. If it is not an originating message, the terminal usage limiting apparatus 105 sends a usage limit message or a rejection message to the target mobile terminal in a step 1307. If it is an originating message, the terminal usage limiting apparatus 105 analyzes the dialed number in a step 1308. This processing is equivalent to the analysis of an emergency call indicator when the non-limited phone number list is held in the mobile terminal 101. The number obtained as a result of this number analysis is then compared with the numbers in the non-limited phone number list in a step 1309. If the call is decided not to be an emergency call as a result of the comparison, the terminal usage limiting apparatus 105 sends a usage limit message or rejection message to the target mobile terminal in a step 1310. If the call is determined to be an emergency call, the terminal usage limiting apparatus 105 selects a base station to which the target mobile terminal 101 is to be switched according to the neighbor base station information in a step 1311. Then, the terminal usage limiting apparatus 105 sends an emergency call handoff message to the target mobile terminator in a step 1312.

(Embodiment 5)

Figure 14:
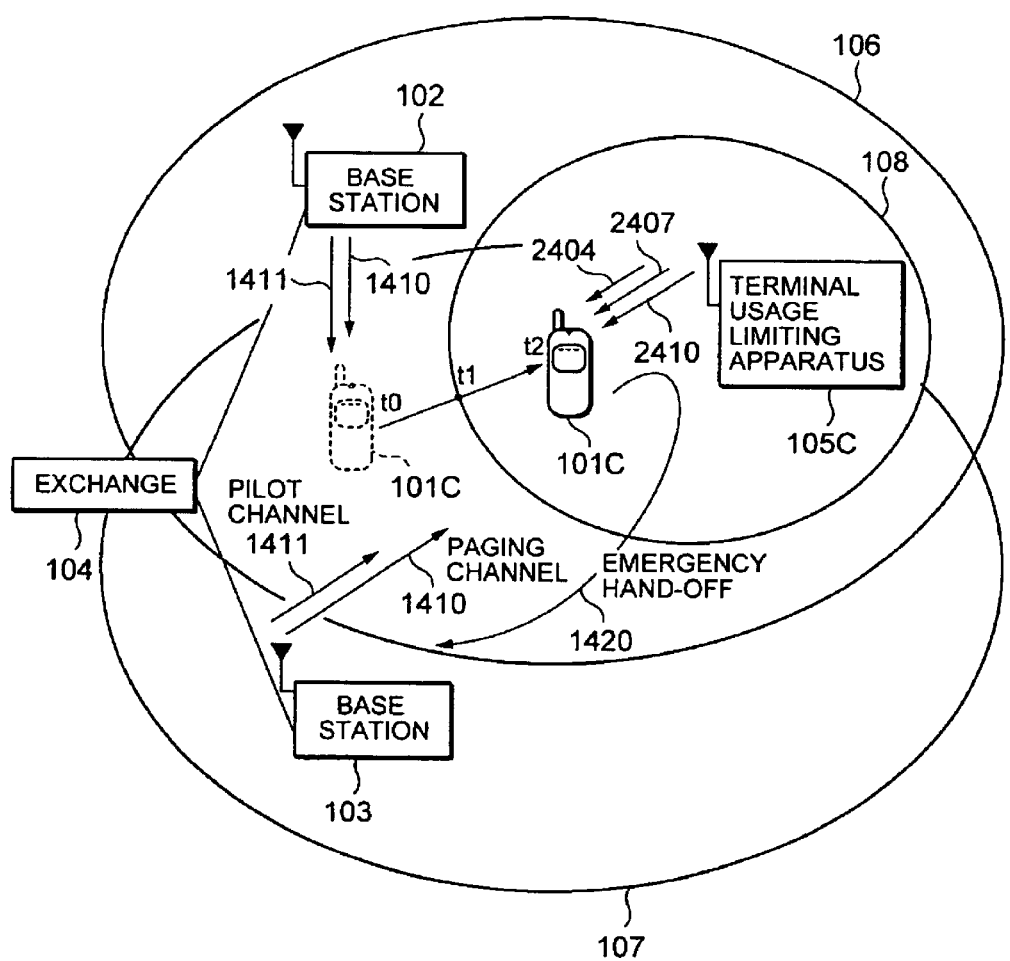
FIG. 14 is another block diagram illustrating the embodiment of the mobile communication system according to the embodiment of the present invention.

FIG. 14 is a block diagram illustrating a fifth preferred embodiment of the mobile communication system according to the current invention. The same items as those shown in FIG. 1 will not be described here to avoid redundant description. Each base station sends signals via both pilot channel 1410 and paging channel 1411. The terminal usage limiting apparatus 105C sends signals via both pilot channel 2404 and paging channel 2407 or 2410. The paging channel is divided into two types; one paging channel 2410 is for sending pseudo control messages and the other paging channel 2407 is for sending usage limit messages. For an emergency call, the mobile terminal 101 is switched via handoff 1420 to a target base station from the terminal usage limiting apparatus 105C.

A pseudo control message means system information that is commonly sent to a plurality of mobile terminals via the paging channel. It includes various information such as a system ID, a network ID, a registered zone ID, base station latitude/longitude information, and etc. The format of the pseudo control message is the same as that of the control messages that is sent from each base station so that each mobile terminal presumes a terminal usage limiting apparatus 105 as a base station.

Figure 15:
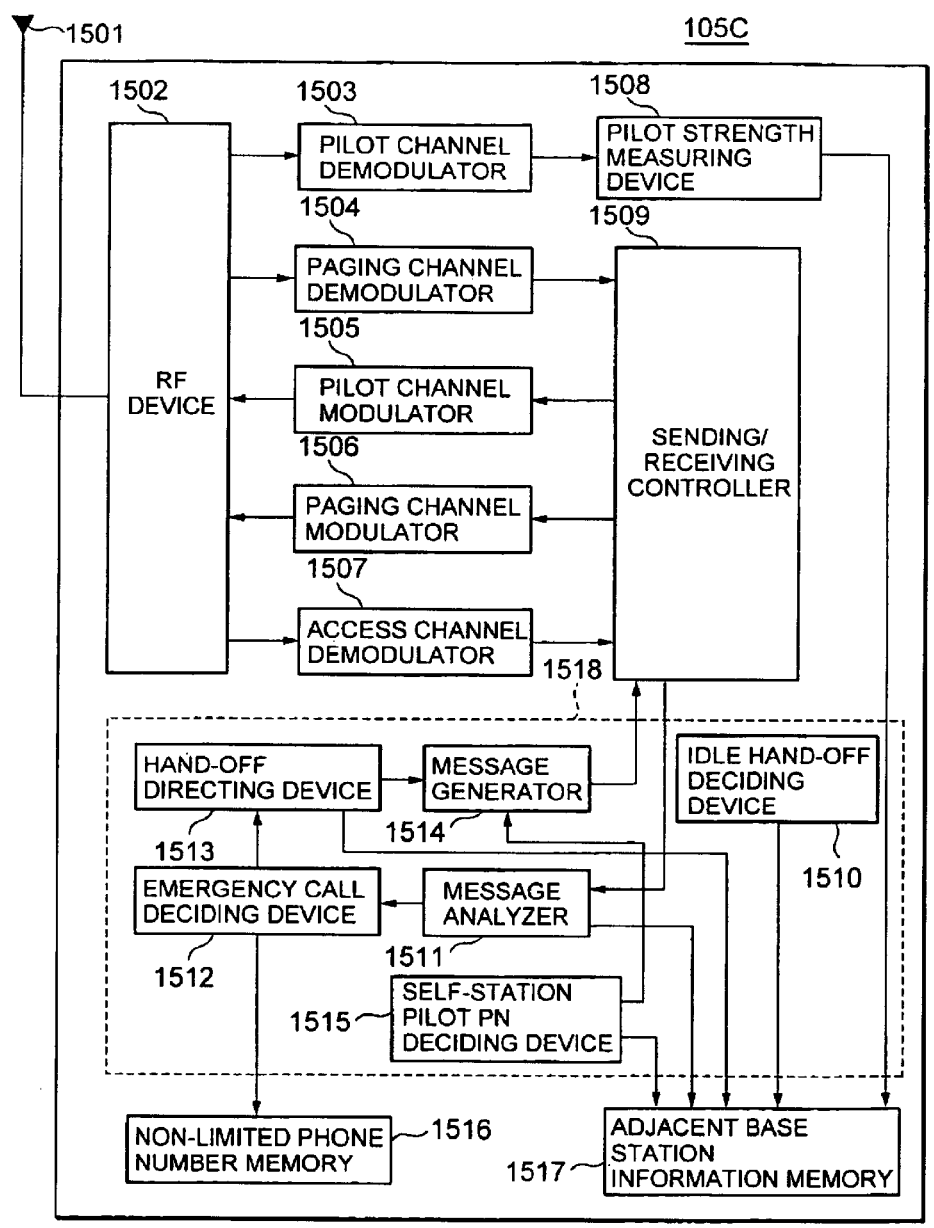
FIG. 15 is still another block diagram illustrating the embodiment of the terminal usage limiting apparatus according to the present invention.

FIG. 15 is a block diagram illustrating the fifth preferred embodiment of the terminal usage limiting apparatus 105C according to the current invention. The terminal usage limiting. apparatus 105C is provided with an antenna device 1501 for sending/receiving radio signals to/from mobile terminals and the base station; an RF device 1502 for converting the frequency of each signal; a pilot channel demodulator 1503 for demodulating the pilot channel signal received from the base station; and a paging channel demodulator 1504 for demodulating the paging signal received from the base station. The terminal usage limiting apparatus 105C further includes a pilot channel modulator 1505 for modulating the pilot information of a terminal usage limiting apparatus 105C to a radio signal and for sending the signal to the RF device 1502; a paging channel modulator 1506 for modulating paging channel information of the terminal usage limiting apparatus 105C to a radio signal and sending the signal to the RF device 1502; an access channel demodulator 1507 for demodulating the access channel signal from each mobile terminal; a pilot strength measuring device 1508 for measuring the strength of the pilot signal received from the base station and updating the table of the neighbor base station information memory 1517 as needed; a sending/receiving controller 1509 for controlling sending/receiving of the pilot channel, the paging channel, and the access channel; a controller (CPU) 1518; a non-limited or unrestricted phone number memory 1516 for storing a list of numbers including emergency call numbers; and an neighbor base station information memory 1517 for storing neighbor base station information analyzed by the message analyzer 1511. In an alternative embodiment, the unrestricted phone number memory 1506 is provided in a mobile terminal.

Additionally, the controller 1518 further includes an idle handoff deciding device 1510 for deciding whether to execute an idle handoff operation according to the pilot strength measured by the pilot strength measuring device 1508 and the neighbor base station information stored in the neighbor base station information memory 1517; a message analyzer 1511 for analyzing messages received from the sending/receiving controller 1509; and an emergency call deciding device 1512 for deciding whether or not an received call is an emergency call according to an emergency call indicator in the received message and for deciding whether or not the receiver phone number in the received message is enlisted in the non-limited phone number memory 1516. The controller 1518 also further includes a handoff directing device 1513 for selecting the base station for a handoff operation from the list of the neighbor base stations in the neighbor base station information memory and for directing the target mobile terminal to be switched (handoff) to another base station when the emergency call deciding device 1512 determines that a received call is an emergency one; a message generator 1514 for generating a message and for commanding the sending/receiving controller 1509 to send the message; and a self-station pilot PN deciding device 1515 for deciding a pilot PN sequence offset of the terminal usage limiting apparatus as a pilot PN sequence offset that is different from those of the neighbor base stations based upon the neighbor base station information memory 1517.

Figure 16:
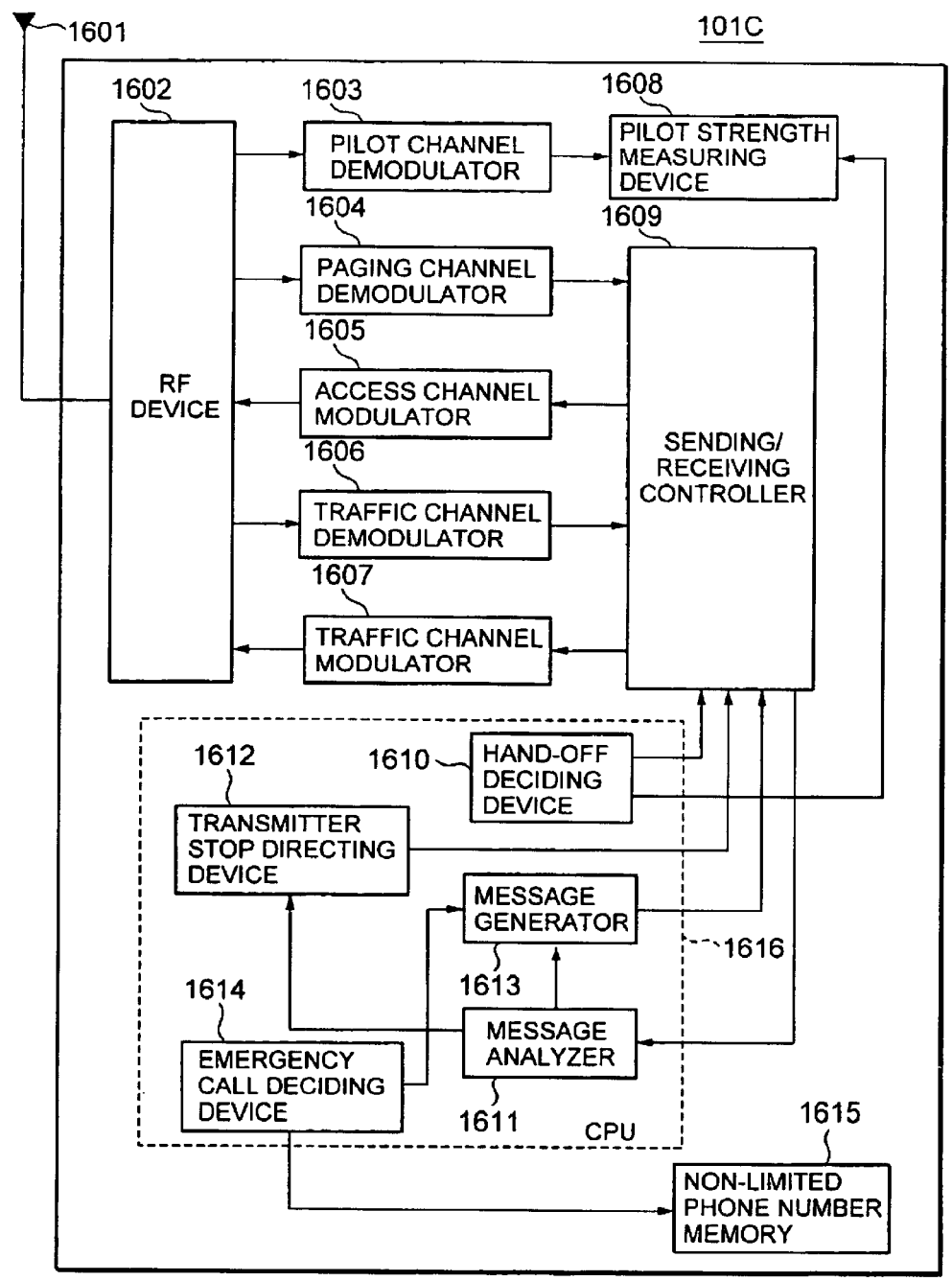
FIG. 16 is a block diagram illustrating embodiment of the mobile terminal according to the present invention.

FIG. 16 shows a block diagram of a fifth preferred embodiment of the mobile terminal 101C according to the current invention. The mobile terminal 101C is provided with an antenna device 1601; an RF device 1602; a pilot channel demodulator 1603 for demodulating the pilot signals from a base station and a terminal usage limiting apparatus; a paging channel demodulator 1604 for demodulating the paging channel signals from the base station and the terminal usage limiting apparatus; an access channel modulator 1605 for modulating a control message sent via the access channel to a radio signal and for sending the signal to the RF device 1602; and a traffic channel demodulator 1606 for demodulating the down traffic channel signal from the base station. The mobile terminal 101C further includes a traffic channel modulator 1607 for modulating data and control messages sent via the up-traffic channel to radio signals and for sending the signals to the RF device 1602; a pilot strength measuring device 1608 for measuring the pilot strength from a received pilot signal; a sending/receiving controller 1609 for controlling to send or receive signals; a non-limited phone number memory 1615 for storing emergency and other phone numbers that are excluded from the usage limitation; and a controller (CPU) 1616.

Furthermore, the controller (CPU) 1616 includes a handoff deciding device 1610 for deciding whether or not to execute a handoff operation according to the pilot strength measured by the pilot strength measuring device 1608; a message analyzer 1611 for analyzing messages received from the sending/receiving controller 1609; a transmitter stop directing device 1612 for directing the sending/receiving controller 1609 to stop the transmission when a message that is analyzed by the message analyzer 1611 is a usage limit message; a message generator 1613 for generating messages; and an emergency call deciding device 1614 for deciding whether or not a dialed phone number is such a non-limited phone number for an emergency call based upon the non-limited phone number memory and for directing the message generator 1613 to generate an originating message with an emergency call indicator for indicating a non-limited phone number. The emergency call deciding device 1614 and the non-limited number memory 1615 is included in an alternative embodiment of the terminal usage limiting apparatus 105C. In that case, the mobile terminal 101 sends originating messages and the terminal usage limiting apparatus 105C decides whether or not the messages are emergency ones.

Still referring to FIG. 14, a description will be made with respect to certain steps in FIG. 8, for an operation of the mobile terminal 101C when the mobile terminal 101C moves into a usage limiting area 108 such as a train or bus where the terminal usage limiting apparatus 105C from a normal service area 106. The terminal usage limiting apparatus 105C is installed in a train or bus and sends out a pilot signal with a pilot strength enough to cover the usage limiting area 18 such as a train or a bus. The pilot channel for sending this pilot signal is spreading-modulated with a Pilot PN offset that is different from those of the neighbor base stations by the pilot channel modulator 1505. The pilot channel signal is sent from the RF device 1502 and the antenna device 1501 in the step 804. This pilot channel signal is assumed as a special signal that can distinguish the terminal usage limiting apparatus from the base station. Based upon the distinction, the target mobile terminal 101 is switched or handed off to the terminal usage limiting apparatus 105C.

The terminal usage limiting apparatus 105C generates paging channel messages by spreading-modulating the pseudo control messages generated by the message generator 1514 in the paging channel modulator 1506 so that the terminal usage limiting apparatus 105C itself appears to be a base station for the mobile terminal 101, thereby sending the messages to the mobile terminal 101 in the step 810.

The terminal usage limiting apparatus 105C generates a usage limit message in the message generator 1514, spreading-modulates the message in the paging channel modulator 1506, and then sends the message to the mobile terminal 101 so as to limit the mobile terminal 101C in usage in the step 807.

On the other hand, the base station 102 sends control messages to the mobile terminal 101C via the paging channel in the step 801. At time t0, the mobile terminal 101C receives various control messages from the base station 102 in the paging channel via the paging channel demodulator 1604 in the step 802 so that the mobile terminal 101C is synchronized with the mobile communication system. In this state, the mobile terminal 101C is free to communicate with other mobile terminals via the base station 102. After that, the mobile terminal 101C moves in the direction of the vertical arrow. Upon reaching the point of time t1, the pilot strength measuring device 1608 detects the pilot channel signal of the terminal usage limiting apparatus 105C as a strong electric field pilot signal in a step 805. This detection is notified to the handoff deciding device 1610.

Notified of the strong electric field pilot signal, the handoff deciding device 1610 decides switching of the mobile terminal 101 (idle handoff) to the terminal usage limiting apparatus 105C in a step 806. After the idle handoff operation is executed, the mobile terminal 101C receives a paging channel message from the terminal usage limiting apparatus 105C and back-spreading-modulates the message in the paging channel demodulator 1604 and sends the demodulated usage limit message to the message analyzer 1611 in a step 807.

The message analyzer 1611 analyzes the message. If deciding the message to be a usage limit one, the message analyzer 1611 directs the transmitter stop directing device 1612 to stop the transmitter. The transmitter stop directing device 1612 then directs the sending/receiving controller 1609 to stop the transmission, and the sending/receiving controller 1609 then enters into the operation limit mode in a step 808. In the mobile terminal 101C in the operation limit mode, the transmitter is disabled. Thus, the mobile terminal 101C never sends any originating message even when a user requests a call origination. However, the mobile terminal 101C can makes emergency calls even in this state. An originating processing for an emergency phone number will be described later.

The mobile terminal 101C notifies the user that it is now in a usage limiting area via a message displayed on the screen and sets in the operation limit mode in a step 809. FIG. 9 shows how such a message is displayed on the screen of the mobile terminal. Furthermore, referring back to FIGS. 8, 14 and 16, the mobile terminal 101C receives a signal from the terminal usage limiting apparatus 105C with a long code mask corresponding to the terminal usage limiting apparatus 105C. Because the mobile terminal 101C receives no message via the paging channel from base stations 102 and 103 whose long code masks are different from that of the terminal usage limiting apparatus 105C, the mobile terminal 101C is also limited in terminating messages.

The mobile terminal 101C maintains its receiver for operation even in the operation limit mode so as to receive pseudo control messages from the terminal usage limiting apparatus 105C at the message analyzer 1611 via the paging channel demodulator 1604 in a step 811. Thus, the mobile terminal 101C is synchronized with the mobile communication system.

Consequently, the mobile terminal 101C makes emergency calls any time as to be described later. If the mobile terminal 101C leaves the usage limiting area 108, the mobile terminal is switched to the base station at an idle time (idle handoff) and it does not receive usage limit messages at the message analyzer 1611 for a certain time, thereby returning to the normal operation mode.

(Embodiment 6)

Figure 17:
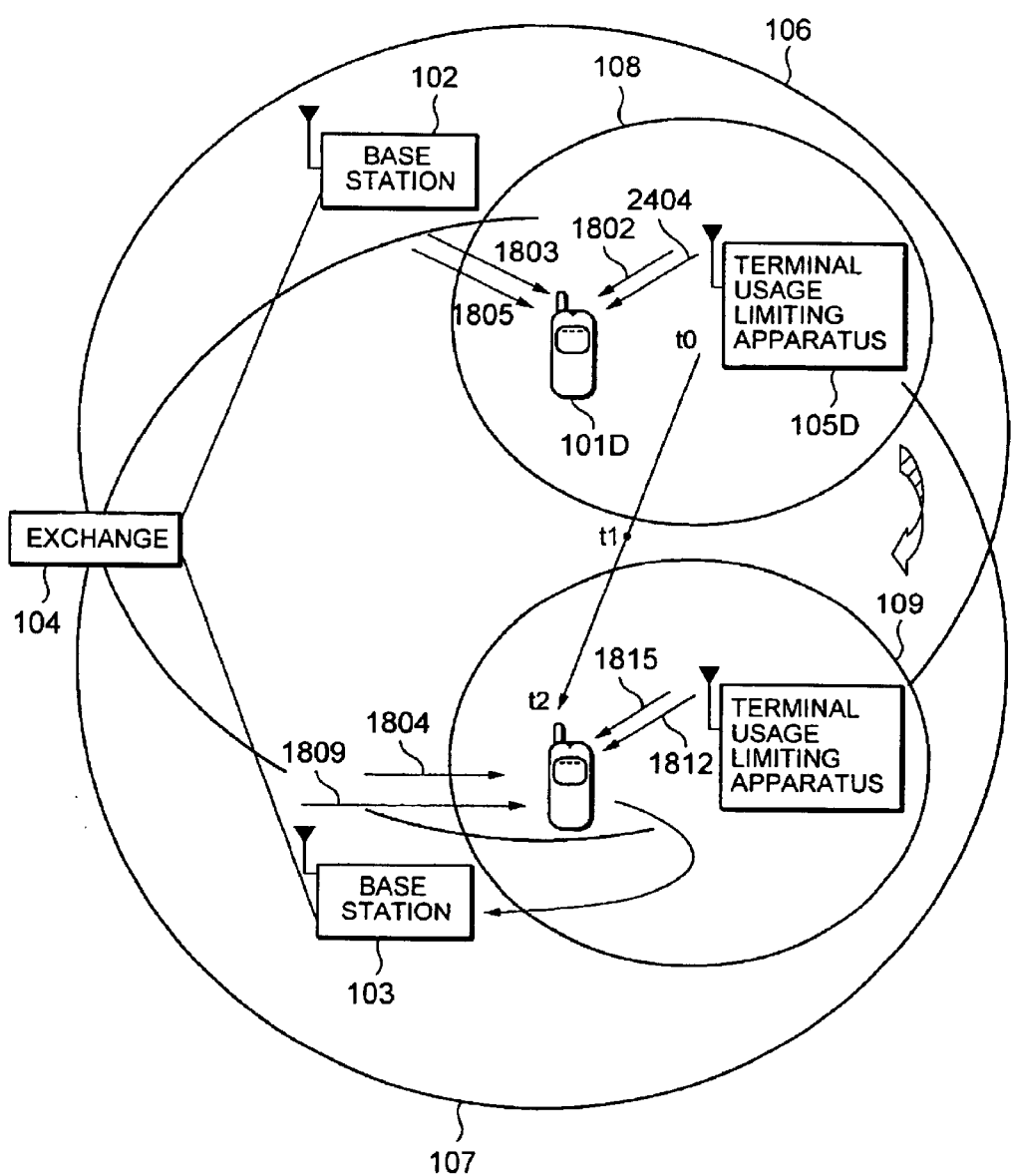
FIG. 17 is a diagram illustrating the operation of the terminal usage limiting apparatus while the terminal usage limiting apparatus is moving from a base station to another.

In a sixth preferred embodiment, it is intended to limit the usage of the mobile terminal 101D in moving objects such as trains, cars, aircrafts, etc. In this case, not only the mobile terminal 101D, but also the terminal usage limiting apparatus 105D moves together with the moving object. Therefore, it should be carefully avoided that the moving terminal usage limiting apparatus 105D adversely affects the neighboring base station during the movement. FIG. 17 shows how the mobile terminal 101D is switched (idle handoff) to the terminal usage limiting apparatus 105. At this time, the mobile terminal is located on a train in which the terminal usage limiting apparatus 105 is installed. Hereunder, with reference to FIGS. 17 and 18, a description will be provided for a processing while the mobile terminal 101 and the terminal usage limiting apparatus 105 are moving from a base station 102 to another 103 together with the train.

When the terminal usage limiting apparatus 105D moves together with a moving object, much care should be paid so that a Pilot PN offset is set so as not to adversely affect the neighbor base stations. In order to automatically determine its own Pilot PN offset, the terminal usage limiting apparatus 105D should know the Pilot PN offsets of the neighbor base stations. If this is automatically done, the user will be able to save labor to set it by himself or herself when the terminal usage limiting apparatus 105D is installed.

In FIG. 17, the base station 102 sends a pilot channel signal 1803 and a control message 1805 to the mobile terminal 101D at t=0. The base station 103 sends a pilot channel signal 1804 and a control message 1809 to the mobile terminal 101D at t=2. The terminal usage limiting apparatus 105 sends a pilot channel signal 1812 and pseudo control messages 1802 and 1815 to the mobile terminal 101D respectively at t=0 and t=2.

Figure 18:
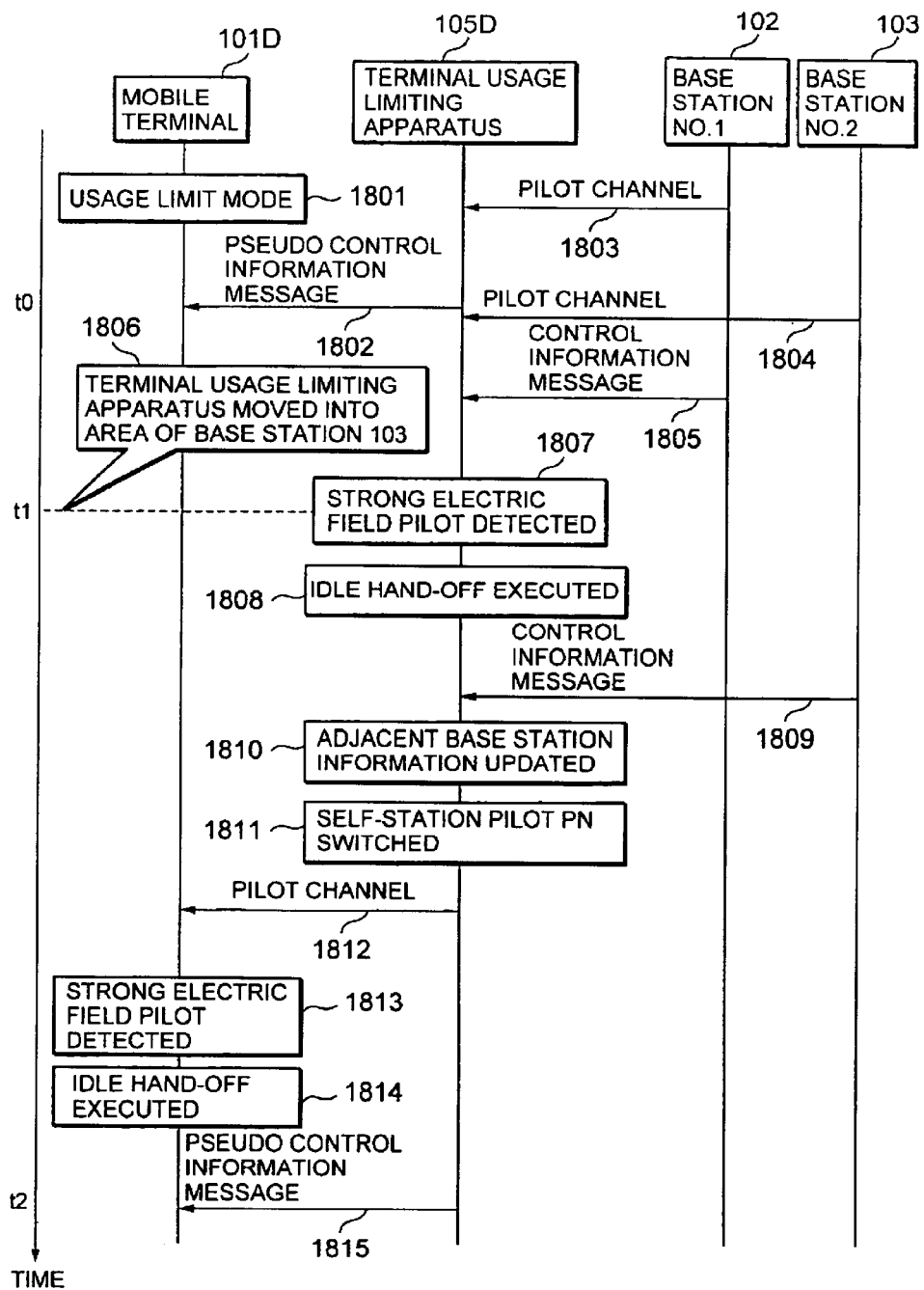
FIG. 18 is a message sequence when the terminal usage limiting apparatus is moving from a base station to another.

FIG. 18 shows a message sequence that is executed by the terminal usage limiting apparatus 105D, the base stations 102, 103, and the mobile terminal 101D. With respect to FIG. 15, certain steps of the operations of both mobile terminal 101D and terminal usage limiting apparatus 105D are described. At first, the mobile terminal 101D is in the use limit mode in a step 1801 and receives pseudo control messages that are continuously sent from the terminal usage limiting apparatus 105D at the message analyzer 1611 via the paging channel demodulator 1604 in a step 1802. In the usage limit mode, the transmitter of the mobile terminal 101D is disabled.

The terminal usage limiting apparatus 105D receives pilot signals from such neighbor base stations 102 and 103 via the pilot channel demodulator 1503 in steps 1803, 1804. The pilot strength measuring device 1508 measures the strength of each pilot signal and stores the measurement result (pilot strength) in the neighbor base station information memory 1517. In addition, the terminal usage limiting apparatus 105D receives control messages from the base station 102 at the message analyzer 1511 via the paging channel demodulator 1504 in a step 1805 and stores the neighbor base station information including neighbor base station pilot PN information from the received message in the neighbor base station information memory 1517. FIG. 19 shows an example of the neighbor base station information table 1901 stored in the neighbor base station information memory 1517.

Referring back to FIG. 18, when the terminal usage limiting apparatus 105D and the mobile terminal 101D reach the point of time t1 together in a step 1806, the pilot strength measuring device 1508 of the terminal usage limiting apparatus 105D detects the pilot channel signal from the base station 103 as a strong electric field pilot signal in a step 1807 and stores the pilot strength in the neighbor base station information table 1901 of the neighbor base station information memory 1517. In executing the handoff operation in a step 1808, the idle handoff deciding device 1510 decides to switch the base station 102 (idle handoff) to the base station 103 as a result of reference to the neighbor base station information table 1901 of the neighbor base station information memory 1517 and also switches the code mask to a long code mask corresponding to the base station 103. The terminal usage limiting apparatus 105D thus receives control messages from the base station 103 at the message analyzer 1511 via the paging channel demodulator 1504 in a step 1809, then updates the neighbor base station information in a step 1810 and stores the updated information in the neighbor base station information table 1801 of the neighbor base station information memory 1517.

Next, the self-station pilot PN deciding device 1515 selects a unique pilot PN sequence offset with respect to the neighbor base station information table 1901 of the neighbor base station information memory 1517 to avoid a duplicate of the pilot PN sequence offsets of the neighbor base stations. For example, the device 1515 selects base station AAA that is not used by any neighbor base stations as a unique pilot PN sequence offset from the neighbor base station information table 1901 as shown in FIG. 19. The self-station pilot PN deciding device 1515 directs both the message generator 1511 and the sending/receiving controller 1509 so as to switch the pilot PN sequence offset of the terminal usage limiting apparatus 105D to the selected pilot PN sequence offset respectively in a step 1811.

The sending/receiving controller 1509 directs the pilot channel modulator 1505 so as to generate a pilot channel signal based upon the newly decided pilot PN sequence offset. The pilot channel signal generated by the pilot channel modulator 1505 is sent via the RF device 1502 and antenna device 1501 in a step 1812. The pilot strength measuring device 1608 of the mobile terminal 101D detects the pilot channel signal having the new pilot PN sequence offset from the terminal usage limiting apparatus 105 as a strong electrical field pilot channel signal in a step 1813. Upon detection, the handoff deciding device 1610 determines a switch (idle handoff) to the new pilot PN sequence offset of the terminal usage limiting apparatus 105D and directs the sending controller 1609 to execute the switching (idle handoff) to the new pilot PN sequence offset. The sending controller 1609 directs both the modulator and the demodulator of each channel to respectively modulate and demodulate the channel with the new pilot PN sequence offset in a step 1814. This processing switches the pilot PN, but the mobile terminal 101D still remains in the handoff state to the terminal usage limiting apparatus 105D.

Even in this state, the mobile terminal 101D receives pseudo control messages including usage limit messages from the terminal usage limiting apparatus 105D at the message analyzer 1611 via the paging channel demodulator 1604 so as to maintain the use limit mode.

(Embodiment 7)

Next, a description will be made for an emergency call made when the mobile terminal 10 located in a terminal usage limiting area such as a train, bus, or the like is limited in usage with reference to FIGS. 15, 16 and 20. It is assumed that, a user makes an emergency call at time t2 as shown in FIG. 17. The emergency phone number list shown in FIG. 10 is assumed to be in the non-limited phone number memory 1516 in the terminal usage limiting apparatus 105. As described above, in FIG. 10, reference numeral 1001 denotes a non-limited phone number list that is stored either in a mobile terminal or in a terminal usage limiting apparatus so as to overcome the usage limit of the mobile terminal in an emergency, etc. according to the present invention. This table contains certain unrestricted numbers that enable call originations even when the mobile terminal is within a usage limiting area. The non-limited phone number list 1001 is preferably held in the non-limited phone number memory 1516 in a mobile terminal 101C so as to minimize the modification to the currently available mobile terminals. In the seventh embodiment, therefore, a description will be provided on the assumption that the non-limited phone number list 1001 is held in the non-limited phone number memory 1516 of a terminal usage limiting apparatus 105C. If the non-limited phone number list 1001 is held in the non-limited phone number memory 1615 in a mobile terminal 1010, each dialed number is analyzed in the mobile terminal, and it is also decided whether or not to output a message.

Now referring to FIG. 20, at time t2, the mobile terminal 101 is set in the operation or usage limit mode so that it cannot make normal call originations in a step 2001. The terminal usage limiting apparatus 105C generates pseudo control messages at the message generator 1514 and keeps sending them out via the paging channel modulator 1506 in a step 2002. Consequently, the mobile terminal 101C receives those pseudo control messages at the message analyzer 1611 via the paging channel demodulator 1604 to be synchronized with the mobile communication system.

The terminal usage limiting apparatus 105C keeps receiving pilot channel signals from neighbor base stations via the pilot channel demodulator 1503 in steps 2003, 2004. The pilot strength measuring device 1508 measures each pilot strength and stores the result or pilot strength in the neighbor base station information memory 1517 in a step 2006.

At time t2, the terminal usage limiting apparatus 105C keeps receiving control messages from the base station 103 at the message analyzer 1511 via the paging channel demodulator 1504 and sets the received neighbor base station information of neighbor base stations such as pilot PN information in the neighbor base station information memory 1517 in a step 2006.

At first, a user dials an emergency number "119" in a step 2007. The mobile terminal 101C then generates an originating message at the message generator 1613 and directs the sending/receiving controller 1609 to send the message to the terminal usage limiting apparatus 105C via the access channel modulator 1605 in a step 2008.

The terminal usage limiting apparatus 105C receives the message at the message analyzer 1511 via the access channel demodulator 1507. The emergency call deciding device 1512 then analyzes the dialed number of the received message to compare it with the numbers in the non-limited phone number list 1001 in the non-limited phone number memory 1516. Because the dial number "119" is included in the non-limited phone number list 1001, the emergency call deciding device 1512 decides that the call is an emergency in a step 2010 and notifies the handoff directing device 1513. The handoff directing device 1513 refers to the neighbor base station information table 1901 of the neighbor base station information memory 1517 to select the base station 103 with the strongest pilot strength in a step 2011 and directs the message generator 1514 to generate a handoff directing message which specifies the base station 103.

The message generator 1514 generates a handoff directing message specifying the pilot PN sequence offset of the base station 103 and directs the sending/receiving controller 1509 to send the message to the mobile terminal via the paging channel modulator 1506 in a step 2012. Upon receiving the handoff directing message, the mobile terminal 101 modulates the message at the access channel modulator 1605 using a long code mask which includes the specified pilot PN sequence offset and sends it again in a step 2013. In this case, the base station receives the message, and the subsequent processings are substantially identical to those of normal call originations between the mobile terminal 101 and the base station 103.

Now referring to FIG. 21, a description will be provided for an operation flow of a terminal usage limiting apparatus 105C according to the present invention. At first, the terminal usage limiting apparatus 105C keeps sending a pilot signal having a pilot PN sequence offset that is different from those of neighbor base stations in a step 2101. In addition, the terminal usage limiting apparatus 105C keeps sending pseudo control messages and usage limit messages via the paging channel in a step 2102. Furthermore, the terminal usage limiting apparatus 105 keeps receiving pilot signals from neighbor base stations in a step 2103. The terminal usage limiting apparatus 105 measures and stores the pilot strength of each of those pilot signals. Furthermore, the terminal usage limiting apparatus 105 receives control messages from the present active (handoff) base station via the paging channel so as to store neighbor base station information.

Next, the terminal usage limiting apparatus 105 continuously decides the necessity to switch (handoff) the target mobile terminal to another base station which is different from the present active (handed off) base station based upon the pilot strength of each of the neighbor base stations in a step 2105. When it is decided that switching (idle handoff) is necessary, the terminal usage limiting apparatus 105 switches the long code mask of the paging channel receiving system to that of the object base station in a step 2106 and switches (handoff) the mobile terminal to the base station so as to continue receiving the paging channel signal from the new base station in a step 2104.

After that, the terminal usage limiting apparatus 105 continuously decides the necessity to switch the pilot PN sequence offset of its pilot channel demodulator 1603 in a step 2107. If there is a neighbor base station that uses the same pilot PN sequence offset as that of the terminal usage limiting apparatus 105, the terminal usage limiting apparatus 105 decides to switch its own pilot PN sequence offset to another in a step 2108. After this change, the terminal usage limiting apparatus 105 continuously sends a pilot signal having the new pilot PN sequence offset in a step 2101. The terminal usage limiting apparatus 105 repeats the above processings.

On the other hand, the terminal usage limiting apparatus 105 waits for messages received from mobile terminals via the access channel in a step 2109. Upon receiving an originating message, the terminal usage limiting apparatus 105 analyzes the dialed number in the originating message in a step 2110. If the call is decided as non-emergency, the terminal usage limiting apparatus 105 sends a rejection message to the mobile terminal in a step 2112 so as to disable the call originations from the mobile terminal 101. If the call is decided as emergency, the terminal usage limiting apparatus 105 selects a hand-off base station with the strongest pilot signal as the target base station in a step 2113 and switches the mobile terminal 101 to the new base station decided in the step 2113. The terminal usage limiting apparatus 105 sends a handoff directing message to the mobile terminal to send the message again in a step 2114. The terminal usage limiting apparatus 105 then waits for the next message.

According to the present invention, therefore, it is possible to limit the use of mobile terminals such as portable telephones, etc. in making and receiving calls in certain predetermined static or dynamic areas, including movie theaters and trains. According to the present invention, it is also possible to receive or make certain predetermined specific calls even in the restricted areas.

What is claimed is:

1. A terminal usage limiting apparatus for temporary use with a mobile terminal communication, comprising:

a signal transmitter for transmitting a signal in a predetermined size of an area defining a restricted area where the use of the mobile terminal is restricted, the signal having a characteristic that is substantially indistinguishable from a predetermined characteristics of a base station;

a message generator connected to said signal transmitter for generating said signal which includes information identifying the terminal usage limiting apparatus;

an access channel demodulator for demodulating a signal that is received from the mobile terminal;

a message analyzer connected to said access channel demodulator for analyzing the demodulated signal;

a restricted phone number memory for storing a predetermined list of phone numbers that are allowed to call in the restricted area;

an emergency call deciding device connected to said message analyzer and said restricted phone number memory for determining whether or not a requested phone number is an emergency call by comparing the requested phone number to the predetermined list in response to a call origination message from said message analyzer; and a hand-off directing device connected to said emergency call deciding device and said message generator for directing said message generator to generate an emergency call hand-off message to force the mobile terminal to switch from the terminal usage limiting apparatus to an available base station in response to the emergency call, the emergency call hand-off message including base station ID information on the available base station.

2. The terminal usage limiting apparatus for temporary use with a mobile terminal communication according to claim 1 wherein said message generator generates base station ID information and a pseudo control information message as said signal.

3. The terminal usage limiting apparatus for temporary use with a mobile terminal communication according to claim 2 wherein said pseudo control information message includes a handoff prompt signal indicative of a switch from the base station to the terminal usage limiting apparatus.

4. The terminal usage limiting apparatus for temporary use with a mobile terminal communication according to claim 1 wherein said message generator generates a first command signal for disabling transmission from the mobile terminal.

5. The terminal usage limiting apparatus for temporary use with a mobile terminal communication according to claim 4 wherein said message generator generates a second command signal indicative of a longer interval for receiving said signal at the mobile terminal.

6. The terminal usage limiting apparatus for temporary use with a mobile terminal communication according to claim 1 wherein said message analyzer determined that the demodulated signal is a call origination message, said message generator generates a rejection message in response to the call origination message.

7. The terminal usage limiting apparatus for temporary use with a mobile terminal communication according to claim 1 wherein said message generator generates an emergency call regeneration message to the mobile terminal, the emergency call regeneration message corresponding to the emergency call and being indicative of repeating the emergency call.

8. The terminal usage limiting apparatus for temporary use with a mobile terminal communication according to claim 1 wherein said message generator generates a usage limit message indicative of the limited use of the mobile terminal.

9. The terminal usage limiting apparatus for temporary use with a mobile terminal communication according to claim 1 further comprising:
   an adjacent base station information memory unit for storing base unit information on base stations located near the terminal usage limiting apparatus; and
   a self-station pilot PN deciding device connected to said adjacent base station information memory unit for determining a unique one of said signal which includes information identifying the terminal usage limiting apparatus based upon the base unit information.

10. The terminal usage limiting apparatus for temporary use with a mobile terminal communication according to claim 9 further comprising:
    a pilot strength measuring device connected to said adjacent base station information memory unit for measuring the strength of a pilot signal and updating the base unit information; and
    an idle hand-off deciding device connected to said adjacent base station information memory unit for determining whether or not to execute an idle handoff operation based upon the base unit information.

11. A mobile terminal for use in a restricted use area with a terminal usage limiting apparatus, comprising:
    a receiver for receiving a signal for wireless communication;
    a restricted phone number memory unit for storing a list of predetermined emergency numbers;
    an emergency deciding device connected to said restricted phone number memory unit for determining whether or not a requested phone number is an emergency by comparing the requested phone number to the predetermined emergency numbers;
    a message generator connected to said emergency deciding device for generating an emergency signal indicative of emergency in response to said emergency deciding device; and
    a transmitter connected to said message generator for transmitting the emergency signal to the terminal usage limiting apparatus, in response to the emergency signal, said receiver receiving information for forcing the mobile terminal to be switched from the terminal usage limiting apparatus to an available base station.

12. The mobile terminal for use in a restricted use area according to claim 11 further comprising:
    a message analyzer connected to said receiver for analyzing the signal that is received from the terminal usage limiting apparatus, the received signal including a transmitter disable message; and
    a transmitter stop directing device connected to said message analyzer for disabling said transmitter in response to the transmitter disable message.

13. The mobile terminal for use in a restricted use area according to claim 11 further comprising:
    a pilot strength measuring device connected to said receiver for measuring the strength of a pilot signal from a base station and the terminal usage limiting apparatus; and
    a hand-off deciding device connected to said pilot strength measuring device for switching between the base station and the terminal usage limiting apparatus based upon the measured strength of the pilot signal, whereby the use of the mobile terminal is restricted while the mobile terminal receives the signal from the terminal usage limiting apparatus.

14. The mobile terminal for use in a restricted use area according to claim 13 further comprising a display unit for indicating that the use of the mobile terminal is limited.

15. The mobile terminal for use in a restricted use area according to claim 13 further comprising an audio unit for indicating that the use of the mobile terminal is limited.

16. The mobile terminal for use in a restricted use area according to claim 13 further comprising a tactile unit connected for indicating that the use of the mobile terminal is limited.

17. The mobile terminal for use in a restricted use area according to claim 16 wherein said tactile unit is a vibrator, said vibrator vibrating at a predetermined frequency that is different from another predetermined frequency which is used to indicate an incoming call.

18. A method of restricting the use of a mobile terminal in a predetermined area, comprising:
    determining a unique station information on a terminal usage limiting apparatus for identifying a transmission source;
    storing a predetermined set of emergency calls;
    periodically transmitting to the mobile terminal a signal including the unique station information in a predetermined area;
    receiving a signal from the mobile terminal;
    determining whether or not the received signal is a call origination request to one of the predetermined set of the emergency calls;
    forcing the mobile terminal to switch from the terminal usage limiting apparatus to an available base station via a hand-off message in response to said determining step; and allowing the mobile terminal to retransmit the call origination request directly to the base station.

19. The method of restricting the use of a mobile terminal in a predetermined area according to claim 18 further comprising an additional act of periodically transmitting to the mobile terminal the signal indicative limited use of the mobile terminal.

20. The method of restricting the use of a mobile terminal in a predetermined area according to claim 18 further comprising an additional acts of:
   periodically collecting information on the base station located near the transmission source;
   periodically storing the information on the base station located near the transmission source; and
   periodically updating the information.

21. The method of restricting the use of a mobile terminal in a predetermined area according to claim 20 further comprising an additional act of periodically updating the unique station information for identifying the transmission source base upon the updated information on the base station located near the transmission source.

22. The method of restricting the use of a mobile terminal in a predetermined area according to claim 18 wherein the base station transmits the signal that is the strongest in transmission power with respect to the mobile terminal.

23. The method of restricting the use of a mobile terminal in a predetermined area according to claim 18 wherein a rejection message is sent to the mobile terminal in response to the call origination request.

24. The method of restricting the use of a mobile terminal in a predetermined area according to claim 23 wherein the rejection message is communicated to a user.

25. The method of restricting the use of a mobile terminal in a predetermined area according to claim 24 wherein the communication is visual.

26. The method of restricting the use of a mobile terminal in a predetermined area according to claim 24 wherein the communication is tactile.

27. The method of restricting the use of a mobile terminal in a predetermined area according to claim 24 wherein the communication is auditory.

* * * * *